(12) United States Patent
McDaniel et al.

(10) Patent No.: US 11,814,457 B2
(45) Date of Patent: *Nov. 14, 2023

(54) PARTICLE SIZE CONTROL OF METALLOCENE CATALYST SYSTEMS IN LOOP SLURRY POLYMERIZATION REACTORS

(71) Applicant: Chevron Phillips Chemical Company LP, The Woodlands, TX (US)

(72) Inventors: Max P. McDaniel, Bartlesville, OK (US); Carlton E. Ash, Owasso, OK (US); Kathy S. Clear, Bartlesville, OK (US); Eric D. Schwerdtfeger, Bartlesville, OK (US); Carlos A. Cruz, Kingwood, TX (US); Jeremy M. Praetorius, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/167,120

(22) Filed: Feb. 10, 2023

(65) Prior Publication Data
US 2023/0192921 A1 Jun. 22, 2023

Related U.S. Application Data

(60) Continuation of application No. 17/889,455, filed on Aug. 17, 2022, which is a continuation of application No. 17/591,673, filed on Feb. 3, 2022, now Pat. No. 11,492,430, which is a division of application No. 17/370,022, filed on Jul. 8, 2021, now Pat. No. 11,326,005, which is a division of application No. 17/092,394, filed on Nov. 9, 2020, now Pat. No. 11,124,586.

(51) Int. Cl.
| | | |
|---|---|---|
| *B01J 31/38* | (2006.01) | |
| *B01J 31/00* | (2006.01) | |
| *C08F 4/64* | (2006.01) | |
| *C08F 210/16* | (2006.01) | |
| *C08J 5/18* | (2006.01) | |
| *C08F 4/6592* | (2006.01) | |
| *B01J 3/00* | (2006.01) | |
| *B01J 37/26* | (2006.01) | |
| *B01J 35/02* | (2006.01) | |

(52) U.S. Cl.
CPC ............ *C08F 210/16* (2013.01); *B01J 31/38* (2013.01); *C08J 5/18* (2013.01); *B01J 3/00* (2013.01); *B01J 35/023* (2013.01); *B01J 37/26* (2013.01); *C08F 4/6592* (2013.01); *C08F 4/65925* (2013.01); *C08F 4/65927* (2013.01); *C08F 2410/07* (2021.01); *C08F 2500/12* (2013.01); *C08F 2500/26* (2013.01); *C08J 2323/20* (2013.01)

(58) Field of Classification Search
CPC . B01J 31/00; B01J 31/38; B01J 35/023; B01J 37/26; C08F 2410/07
See application file for complete search history.

(56) References Cited

U.S. PATENT DOCUMENTS

| | | |
|---|---|---|
| 3,242,099 A | 3/1966 | Manyik |
| 3,248,179 A | 4/1966 | Norwood |
| 3,910,870 A | 10/1975 | Lutze |
| 3,925,338 A | 12/1975 | Ort |
| 4,056,699 A | 11/1977 | Jordan |
| 4,148,766 A | 4/1979 | Mcclain |
| 4,405,495 A | 9/1983 | Lee |
| 4,405,496 A | 9/1983 | Hsu |
| 4,501,885 A | 2/1985 | Sherk |
| 4,714,553 A | 12/1987 | Crouzet |
| 4,737,271 A | 4/1988 | Childs |
| 4,794,096 A | 12/1988 | Ewen |
| 4,808,561 A | 2/1989 | Welborn, Jr. |
| 4,960,525 A | 10/1990 | Dalby |
| 5,122,490 A | 6/1992 | Uwai |

(Continued)

FOREIGN PATENT DOCUMENTS

| | | |
|---|---|---|
| EP | 0173834 A1 | 3/1986 |
| EP | 0522215 A2 | 1/1993 |

(Continued)

OTHER PUBLICATIONS

International Search Report and Written Opinion issued in related application No. PCT/US2022/076299, dated Feb. 23, 2023, 19 pp.
Partial Search Report issued in corresponding application No. PCT/US2022/076299, dated Dec. 20, 2022, 2 pp.
Bird, R. Byron, et al., "Dynamics of Polymeric Liquids," Fluid Mechanics, vol. 1, Second Edition, 1987, cover page, publishing page, pp. xiii-xviii, and 171-172, John Wiley & Sons, Inc.

(Continued)

*Primary Examiner* — Rip A Lee
(74) *Attorney, Agent, or Firm* — Merchant & Gould P.C.

(57) ABSTRACT

Catalyst compositions containing a metallocene compound, a solid activator, and a co-catalyst, in which the solid activator or the supported metallocene catalyst has a d50 average particle size of 15 to 50 μm and a particle size distribution of 0.5 to 1.5, can be contacted with an olefin in a loop slurry reactor to produce an olefin polymer. A representative ethylene-based polymer produced using the catalyst composition has excellent dart impact strength and low gels, and can be characterized by a HLMI from 4 to 10 g/10 min, a density from 0.944 to 0.955 g/cm$^3$, a higher molecular weight component with a Mn from 280,000 to 440,000 g/mol, and a lower molecular weight component with a Mw from 30,000 to 45,000 g/mol and a ratio of Mz/Mw ranging from 2.3 to 3.4.

21 Claims, 6 Drawing Sheets

(56) References Cited

U.S. PATENT DOCUMENTS

| | | |
|---|---|---|
| 5,258,342 A | 11/1993 | Luciani |
| 5,468,703 A | 11/1995 | Kioka |
| 5,565,175 A | 10/1996 | Hottovy |
| 5,575,979 A | 11/1996 | Hanson |
| 5,576,259 A | 11/1996 | Hasegawa |
| 5,641,842 A | 6/1997 | Mcdaniel |
| 5,648,309 A | 7/1997 | Bohm |
| 5,807,938 A | 9/1998 | Kaneko |
| 5,919,983 A | 7/1999 | Rosen |
| 6,107,230 A | 8/2000 | Mcdaniel |
| 6,165,929 A | 12/2000 | Mcdaniel |
| 6,239,235 B1 | 5/2001 | Hottovy |
| 6,262,191 B1 | 7/2001 | Hottovy |
| 6,294,494 B1 | 9/2001 | Mcdaniel |
| 6,300,271 B1 | 10/2001 | Mcdaniel |
| 6,313,061 B1* | 11/2001 | Denton .................. C08F 10/00 502/238 |
| 6,316,553 B1 | 11/2001 | Mcdaniel |
| 6,355,594 B1 | 3/2002 | Mcdaniel |
| 6,376,415 B1 | 4/2002 | Mcdaniel |
| 6,388,017 B1 | 5/2002 | Mcdaniel |
| 6,391,816 B1 | 5/2002 | Mcdaniel |
| 6,395,666 B1 | 5/2002 | Mcdaniel |
| 6,420,497 B1 | 7/2002 | Kufeld |
| 6,524,987 B1 | 2/2003 | Collins |
| 6,548,441 B1 | 4/2003 | Mcdaniel |
| 6,548,442 B1 | 4/2003 | Mcdaniel |
| 6,576,583 B1 | 6/2003 | Mcdaniel |
| 6,613,712 B1 | 9/2003 | Mcdaniel |
| 6,617,278 B1 | 9/2003 | Jin |
| 6,632,894 B1 | 10/2003 | Mcdaniel |
| 6,667,274 B1 | 12/2003 | Hawley |
| 6,699,947 B1 | 3/2004 | Evertz |
| 6,716,924 B2 | 4/2004 | Tsutsui |
| 6,716,938 B2 | 4/2004 | Shveima |
| 6,750,302 B1 | 6/2004 | Mcdaniel |
| 6,806,222 B2 | 10/2004 | Yashiki |
| 6,833,415 B2 | 12/2004 | Kendrick |
| 7,026,494 B1 | 4/2006 | Yang |
| 7,041,617 B2 | 5/2006 | Jensen |
| 7,045,478 B2 | 5/2006 | Yang |
| 7,091,289 B2 | 8/2006 | Wang |
| 7,199,071 B2 | 4/2007 | Zheng |
| 7,199,073 B2 | 4/2007 | Martin |
| 7,223,823 B2 | 5/2007 | Lin |
| 7,226,886 B2 | 6/2007 | Jayaratne |
| 7,276,566 B2* | 10/2007 | Muruganandam ...... C08F 10/00 502/103 |
| 7,294,599 B2 | 11/2007 | Jensen |
| 7,312,283 B2 | 12/2007 | Martin |
| 7,354,981 B2 | 4/2008 | Xiao |
| 7,381,780 B2 | 6/2008 | Apecetche |
| 7,517,939 B2 | 4/2009 | Yang |
| 7,601,665 B2 | 10/2009 | Mcdaniel |
| 7,619,047 B2 | 11/2009 | Yang |
| 7,632,907 B2 | 12/2009 | Sukhadia |
| 7,867,939 B2 | 1/2011 | Xiao |
| 7,884,163 B2 | 2/2011 | Mcdaniel |
| 8,114,946 B2 | 2/2012 | Yang |
| 8,124,708 B2 | 2/2012 | Ameye |
| 8,268,945 B2 | 9/2012 | Zhang |
| 8,309,485 B2 | 11/2012 | Yang |
| 8,445,619 B2 | 5/2013 | Ameye |
| 8,623,973 B1 | 1/2014 | Mcdaniel |
| 8,633,286 B2* | 1/2014 | Kuo ..................... C08F 210/16 525/240 |
| 8,680,218 B1 | 3/2014 | Yang |
| 8,822,608 B1 | 9/2014 | Bhandarkar |
| 8,912,285 B2 | 12/2014 | Yang |
| 8,957,168 B1 | 2/2015 | Yang |
| 8,987,390 B2 | 3/2015 | Bhandarkar |
| 8,993,692 B2 | 3/2015 | Jorgensen |
| 9,000,113 B2 | 4/2015 | Fantinel |
| 9,006,367 B2 | 4/2015 | Mcdaniel |
| 9,023,959 B2 | 5/2015 | Mcdaniel |
| 9,034,994 B2 | 5/2015 | Mcdaniel |
| 9,034,999 B2 | 5/2015 | Robert |
| 9,068,025 B2 | 6/2015 | Wang |
| 9,079,993 B1 | 7/2015 | St. Jean |
| 9,115,280 B2 | 8/2015 | Jan |
| 9,156,970 B2 | 10/2015 | Hilavinka |
| 9,169,337 B2 | 10/2015 | Rohatgi |
| 9,181,370 B2 | 11/2015 | Sukhadia |
| 9,234,060 B2* | 1/2016 | Kao ..................... B01J 31/143 |
| 9,284,389 B2 | 3/2016 | St. Jean |
| 9,321,857 B2 | 4/2016 | Li |
| 9,340,631 B2* | 5/2016 | Willocq ................ C08F 210/16 |
| 9,403,921 B2 | 8/2016 | Bhandarkar |
| 9,493,589 B1 | 11/2016 | Greco |
| 9,540,457 B1 | 1/2017 | Ding |
| 9,540,460 B2* | 1/2017 | Lester ..................... C08F 4/02 |
| 9,556,288 B2 | 1/2017 | Bhandarkar |
| 9,644,049 B2 | 5/2017 | Jorgensen |
| 9,758,600 B1 | 9/2017 | Praetorius |
| 10,100,135 B2* | 10/2018 | Vantomme ............... C08F 4/02 |
| 10,144,788 B2 | 12/2018 | Gerrits et al. |
| 10,246,566 B2 | 4/2019 | Kikuchi |
| 10,358,513 B2 | 7/2019 | Klendworth |
| 10,590,213 B2 | 3/2020 | Rohatgi |
| 10,604,603 B2 | 3/2020 | Dreng |
| 10,703,648 B2 | 7/2020 | Norum |
| 10,730,969 B2* | 8/2020 | Sakai .................... C08F 110/02 |
| 11,123,726 B2* | 9/2021 | Munro .................. C08F 110/14 |
| 11,124,586 B1 | 9/2021 | Mcdaniel |
| 11,208,513 B2* | 12/2021 | Brandl ................. C08F 210/06 |
| 11,420,196 B2* | 8/2022 | McDaniel ............ C08F 110/02 |
| 11,492,430 B2* | 11/2022 | McDaniel ............ C08F 210/16 |
| 2003/0109651 A1 | 6/2003 | Kufeld |
| 2006/0094835 A1 | 5/2006 | Fouarge |
| 2007/0197374 A1 | 8/2007 | Yang |
| 2009/0143546 A1 | 6/2009 | Fouarge |
| 2009/0318643 A1 | 12/2009 | Chen |
| 2011/0130271 A1 | 6/2011 | Wagner |
| 2011/0165419 A1 | 7/2011 | Kumamoto |
| 2012/0202955 A1 | 8/2012 | Zhang |
| 2013/0046040 A1 | 2/2013 | Srinivasan |
| 2013/0115461 A1 | 5/2013 | Jan |
| 2014/0004339 A1 | 1/2014 | Ehlers |
| 2014/0316082 A1 | 10/2014 | Kolling |
| 2015/0166697 A1 | 6/2015 | Vantomme |
| 2015/0368377 A1 | 12/2015 | Lester |
| 2018/0105621 A1 | 4/2018 | Gupta |
| 2018/0273699 A1 | 9/2018 | Kalyanaraman |
| 2019/0185594 A1 | 6/2019 | Dreng |
| 2020/0071438 A1 | 3/2020 | Brandl |
| 2020/0123279 A1 | 4/2020 | Kanellopoulos |
| 2020/0270383 A1 | 8/2020 | Dreng |
| 2021/0269560 A1 | 9/2021 | Krallis |
| 2022/0153887 A1 | 5/2022 | Mcdaniel |
| 2022/0403075 A1* | 12/2022 | McDaniel .................. C08J 5/18 |

FOREIGN PATENT DOCUMENTS

| | | |
|---|---|---|
| EP | 1713834 B1 | 4/2010 |
| EP | 3331924 B1 | 8/2019 |
| EP | 2877502 B1 | 11/2019 |
| WO | 2014016418 A1 | 1/2014 |
| WO | 2014099411 A1 | 6/2014 |
| WO | 2015197435 A1 | 12/2015 |
| WO | 2016102513 A1 | 6/2016 |
| WO | 2020025757 A1 | 2/2020 |
| WO | 2020109452 A1 | 6/2020 |
| WO | 2022099250 A2 | 5/2022 |
| WO | 2022125581 A2 | 6/2022 |

OTHER PUBLICATIONS

Brunauer, et al., "Adsorption of Gases in Multimolecular Layers," Journal of the American Chemical Society. 1938, vol. 60, pp. 309-319.

Film Extrusion Manual—Process, Materials, Properties, TAPPI Press, 1992, 16 pages.

(56) References Cited

OTHER PUBLICATIONS

George Halsey, "Physical Adsorption on Non-Uniform Surfaces," Journal Chem. Phys., vol. 16, Mar. 9, 1948, pp. 931-937.
Hieber, C. A., et al., "Shear-rate-dependence modeling of polymer melt viscosity," Polymer Engineering and Science, Jul. 1992, pp. 931-938, vol. 32, No. 14.
Hieber, C. A., et al., "Some correlations involving the shear viscosity of polystyrene melts," Rheol Acta, 1989, pp. 321-332, vol. 28.
IUPAC Compendium of Chemical Terminology, 2nd Ed. 1997, pp. 1-1670.
Janzen, et al., "Diagnosing Long-Chain Branching in Polyethylene," Journal of Mol. Struct., 485/486, 1999, pp. 569-584.
John Landers, et al., "Density Functional Theory Methods for Characterization of Porous Materials," Colloids and Surfaces A: Physicochemical and Engineering Aspects, 437, 2013, pp. 3-32.
Marsden CE: "Advances in Supported Chromium Catalysts", Plastics, Rubber and Composites Processing and Applications, Essex, GB, vol. 21, No. 4, Jan. 1, 1994 (Jan. 1, 1994), pp. 193-200, XP008057615.
Max P McDaniel: "Review of Phillips Chromium Catalyst for Ethylene Polymerization (Chapter 10)" In: "Handbook of Transition Metal Polymerization Catalysts", Aug. 31, 2010 (Aug. 31, 2010), Wiley, US, XP055562084, ISBN: 978-1-119-24213-0 pp. 291-446.
Modern Plastics Encyclopedia, Mid-Nov. 1995 Issue, vol. 72, No. 12, 3 pages.

\* cited by examiner

PARTICLE SIZE CONTROL OF METALLOCENE CATALYST SYSTEMS IN LOOP SLURRY POLYMERIZATION REACTORS

REFERENCE TO RELATED APPLICATIONS

This application is a continuation application of U.S. patent application Ser. No. 17/889,455, filed on Aug. 17, 2022, now U.S. Patent No. 11,634,521, which is a continuation application of U.S. patent application Ser. No. 17/591,673, filed on Feb. 3, 2022, now U.S. Pat. No. 11,492,430, which is a divisional application of U.S. patent application Ser. No. 17/370,022, filed on Jul. 8, 2021, now U.S. Pat. No. 11,326,005, which is a divisional application of U.S. patent application Ser. No. 17/092,394, filed on Nov. 9, 2020, now U.S. Pat. No. 11,124,586, the disclosures of which are incorporated herein by reference in their entirety.

FIELD OF THE INVENTION

The present disclosure generally relates to loop slurry polymerization processes for producing ethylene polymers, and more particularly, relates to the use of metallocene-based catalyst systems with particular particle size attributes in these loop slurry polymerization processes.

BACKGROUND OF THE INVENTION

Improper particle size features of metallocene-based catalyst systems can lead to operational difficulties during ethylene/α-olefin polymerizations in loop slurry reactors, as well as poor and inconsistent properties of the resulting polymer. It would be beneficial to develop catalyst systems and polymerization processes that overcome these drawbacks. Accordingly, it is to these ends that the present invention is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

The present invention generally relates, in one aspect, to metallocene-based catalyst compositions and to slurry polymerization processes using the catalyst compositions. Such catalyst compositions can comprise a metallocene compound (one or more than one), a solid activator, and optionally, a co-catalyst. The solid activator (or the supported metallocene catalyst) can have a d50 average particle size in a range from 15 to 50 µm and a particle size span ((d90-d10)/d50) in a range from 0.5 to 1.5. Polymerization processes using the metallocene-based catalyst composition can comprise contacting the catalyst composition with an olefin monomer and an optional olefin comonomer in a polymerization reactor system comprising a loop slurry reactor under polymerization conditions to produce an olefin polymer.

Ethylene polymer powder (or fluff) produced by the polymerization processes can have, in another aspect, a d50 average particle size in a range from 150 to 600 µm, a particle size span in a range from 0.5 to 1.6, less than or equal to 20 wt. % of the composition with a particle size of less than 100 µm, and less than or equal to 5 wt. % of the composition with a particle size of greater than 1000 µm.

In yet another aspect, the present invention also is directed to ethylene polymers characterized by a high load melt index (HLMI) in a range from 4 to 10 g/10 min, a density in a range from 0.944 to 0.955 g/cm$^3$, and a higher molecular weight component and a lower molecular weight component, in which the higher molecular weight component can have a Mn in a range from 280,000 to 440,000 g/mol, and the lower molecular weight component can have a Mw in a range from 30,000 to 45,000 g/mol and a ratio of Mz/Mw in a range from 2.3 to 3.4. The lower molecular weight component can be the majority of the ethylene polymer, typically ranging from 56 to 72 wt. % of the ethylene polymer, which is typically in the form of pellets or beads.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects and embodiments may be directed to various feature combinations and sub-combinations described in the detailed description.

DEFINITIONS

Figure 1:
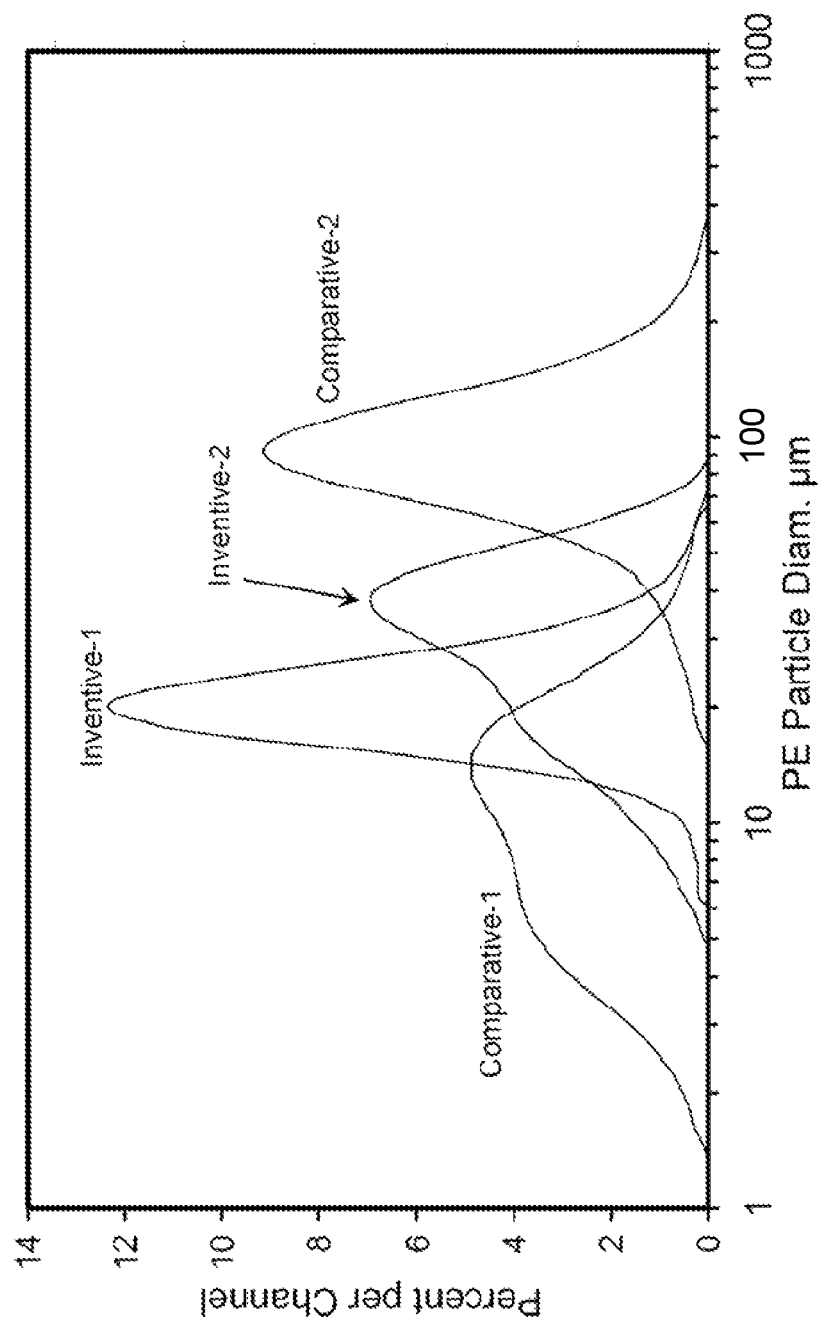
FIG. 1 presents a plot of the particle size distributions of the Inventive 1, Inventive 2, Comparative 1, and Comparative 2 solid activators.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and/or feature disclosed herein, all combinations that do not detrimentally affect the designs, compositions, and/or methods described herein are contemplated with or without explicit description of the particular combination. Additionally, unless explicitly recited otherwise, any aspect and/or feature disclosed herein can be combined to describe inventive features consistent with the present disclosure.

While compositions and methods are described herein in terms of "comprising" various components or steps, the compositions and methods also can "consist essentially of" or "consist of" the various components or steps, unless stated otherwise. For example, a catalyst composition consistent with aspects of the present invention can comprise; alternatively, can consist essentially of; or alternatively, can consist of; catalyst component I, catalyst component II, a solid activator, and a co-catalyst.

The terms "a," "an," "the," etc., are intended to include plural alternatives, e.g., at least one, unless otherwise specified. For instance, the disclosure of "a co-catalyst" or "a metallocene compound" is meant to encompass one, or mixtures or combinations of more than one, co-catalyst or metallocene compound, respectively, unless otherwise specified.

Generally, groups of elements are indicated using the numbering scheme indicated in the version of the periodic table of elements published in *Chemical and Engineering News,* 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

For any particular compound disclosed herein, the general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise; e.g., a general reference to pentane includes n-pentane, 2-methyl-butane, and 2,2-dimethylpropane, while a general reference to a butyl group includes an n-butyl group, a sec-butyl group, an iso-butyl group, and a tert-butyl group. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

The term "substituted" when used to describe a group, for example, when referring to a substituted analog of a particular group, is intended to describe any non-hydrogen moiety that formally replaces a hydrogen in that group, and is intended to be non-limiting. A group or groups can also be referred to herein as "unsubstituted" or by equivalent terms such as "non-substituted," which refers to the original group in which a non-hydrogen moiety does not replace a hydrogen within that group. Unless otherwise specified. "substituted" is intended to be non-limiting and include inorganic substituents or organic substituents as understood by one of ordinary skill in the art.

The term "hydrocarbon" whenever used in this specification and claims refers to a compound containing only carbon and hydrogen. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include alkyl, alkenyl, aryl, and aralkyl groups, amongst other groups.

The term "polymer" is used herein generically to include olefin homopolymers, copolymers, terpolymers, and the like, as well as alloys and blends thereof. The term "polymer" also includes impact, block, graft, random, and alternating copolymers. A copolymer is derived from an olefin monomer and one olefin comonomer, while a terpolymer is derived from an olefin monomer and two olefin comonomers. Accordingly, "polymer" encompasses copolymers and terpolymers derived from any olefin monomer and comonomer(s) disclosed herein. Similarly, the scope of the term "polymerization" includes homopolymerization, copolymerization, and terpolymerization. Therefore, an ethylene polymer includes ethylene homopolymers, ethylene copolymers (e.g., ethylene/α-olefin copolymers), ethylene terpolymers, and the like, as well as blends or mixtures thereof. Thus, an ethylene polymer encompasses polymers often referred to in the art as LLDPE (linear low density polyethylene) and HDPE (high density polyethylene). As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer can be categorized an as ethylene/1-hexene copolymer. The term "polymer" also includes all possible geometrical configurations, unless stated otherwise, and such configurations can include isotactic, syndiotactic, and random symmetries. Moreover, unless stated otherwise, the term "polymer" also is meant to include all molecular weight polymers, and is inclusive of lower molecular weight polymers.

The term "co-catalyst" is used generally herein to refer to compounds such as aluminoxane compounds, organoboron or organoborate compounds, ionizing ionic compounds, organoaluminum compounds, organozinc compounds, organomagnesium compounds, organolithium compounds, and the like, that can constitute one component of a catalyst composition, when used, for example, in addition to a solid activator. The term "co-catalyst" is used regardless of the actual function of the compound or any chemical mechanism by which the compound may operate.

The term "solid activator" is used herein to indicate a solid, inorganic oxide of relatively high porosity, which can exhibit Lewis acidic or Brønsted acidic behavior, and which has been treated with an electron-withdrawing component, typically an anion, and which is calcined. The electron-withdrawing component is typically an electron-withdrawing anion source compound. Thus, the solid activator can comprise a calcined contact product of at least one solid oxide with at least one electron-withdrawing anion source compound. Typically, the solid activator comprises at least one acidic solid oxide compound. The "solid activator" of the present invention can be a chemically-treated solid oxide. The term "solid activator" is used to imply that these components are not inert, and such components should not be construed as an inert component of the catalyst composition. The term "activator," as used herein, refers generally to a substance that is capable of converting a metallocene component into a catalyst that can polymerize olefins, or converting a contact product of a metallocene component and a component that provides an activatable ligand (e.g., an alkyl, a hydride) to the metallocene, when the metallocene compound does not already comprise such a ligand, into a catalyst that can polymerize olefins. This term is used regardless of the actual activating mechanism. Illustrative activators include solid activators, aluminoxanes, organoboron or organoborate compounds, ionizing ionic compounds, and the like. Aluminoxanes, organoboron or organoborate compounds, and ionizing ionic compounds generally are referred to as activators if used in a catalyst composition in which a solid activator is not present. If the catalyst composition contains a solid activator, then the aluminoxane, organoboron or organoborate, and ionizing ionic materials are typically referred to as co-catalysts.

The term "metallocene" as used herein describes compounds comprising at least one $\eta^3$ to $\eta^5$-cycloalkadienyl-type moiety, wherein $\eta^3$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands can include H, therefore this invention comprises ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. In some contexts, the metallocene is referred to simply as the "catalyst," in much the same way the term "co-catalyst" is used herein to refer to, for example, an organoaluminum compound.

The terms "catalyst composition." "catalyst mixture." "catalyst system," and the like, do not depend upon the actual product or composition resulting from the contact or reaction of the initial components of the disclosed or claimed catalyst composition/mixture/system, the nature of the active catalytic site, or the fate of the co-catalyst, metallocene compound, or the solid activator, after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition." "catalyst mixture," "catalyst system," and the like, can be used interchangeably throughout this disclosure.

The term "contact product" is used herein to describe compositions wherein the components are contacted together in any order, in any manner, and for any length of time, unless otherwise specified. For example, the components can be contacted by blending or mixing. Further, contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another. Similarly, the term "contacting" is used herein to refer to materials which can be blended, mixed, slurried, dissolved, reacted, treated, or otherwise combined in some other manner.

Although any methods, devices, and materials similar or equivalent to those described herein can be used in the practice or testing of the invention, the typical methods, devices, and materials are herein described.

All publications and patents mentioned herein are incorporated herein by reference for the purpose of describing and disclosing, for example, the constructs and methodologies that are described in the publications, which might be used in connection with the presently described invention.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. For example, when a chemical moiety having a certain number of carbon atoms is disclosed or claimed, the intent is to disclose or claim individually every possible number that such a range could encompass, consistent with the disclosure herein. For example, the disclosure that a moiety is a $C_1$ to $C_{18}$ hydrocarbyl group, or in alternative language, a hydrocarbyl group having from 1 to 18 carbon atoms, as used herein, refers to a moiety that can have 1, 2, 3, 4, 5, 6, 7, 8, 9, 10, 11, 12, 13, 14, 15, 16, 17, or 18 carbon atoms, as well as any range between these two numbers (for example, a $C_1$ to $C_8$ hydrocarbyl group), and also including any combination of ranges between these two numbers (for example, a $C_2$ to $C_4$ and a $C_{12}$ to $C_{16}$ hydrocarbyl group).

Similarly, another representative example follows for the ratio of Mw/Mn of an ethylene polymer consistent with aspects of this invention. By a disclosure that the ratio of Mw/Mn can be in a range from 20 to 45, the intent is to recite that the ratio of Mw/Mn can be any ratio in the range and, for example, can include any range or combination of ranges from 20 to 45, such as from 20 to 42, from 20 to 30, or from 35 to 45, and so forth. Likewise, all other ranges disclosed herein should be interpreted in a manner similar to these examples.

In general, an amount, size, formulation, parameter, range, or other quantity or characteristic is "about" or "approximate" whether or not expressly stated to be such. Whether or not modified by the term "about" or "approximately," the claims include equivalents to the quantities or characteristics.

DETAILED DESCRIPTION OF THE INVENTION

The present invention is directed generally to single metallocene and dual metallocene catalyst systems, controlling the particle size of the solid activator in these catalyst systems, methods for using the catalyst systems to polymerize olefins in loop slurry reactors, the polymer resins produced using such catalyst systems, and films and other articles of manufacture produced from these polymer resins.

Catalyst particle sizes that perform well in certain fluidized bed gas phase processes are not transferable to loop slurry processes, due in part to differences in catalyst loading/feeding and in downstream polymer transfer, as well as particle settling efficiency in a gaseous medium versus a liquid diluent. For loop slurry processes, the benefits of smaller catalyst particle sizes generally include lower gels, more surface area which increases the potential for collisions and mass transfer, higher saltation velocities, greater potential reactor mass solids, longer reactor residence times, higher activities, and more efficient purge capability. However, there are significant drawbacks to the use of small particle sizes (fines), in particular, difficulties with activation and transfer of the activator/catalyst into the reactor, issues of downstream powder/fluff transfer (since smaller catalyst particles generally make smaller polymer particles), and higher slurry viscosity due the greater surface area of the fine particles. An objective of this invention, therefore, is to target a moderate average catalyst particle size and with a narrow particle size distribution, such that the only a small amount of catalyst particles are fines (e.g., less than 10 microns), while also minimizing the amount of very large catalyst particles (e.g., greater than 50 microns), which also can be problematic, as discussed further below.

Herein, the catalyst composition contains at least one metallocene compound, a solid activator, and typically a co-catalyst. The solid activator (and the supported metallocene catalyst) would have the described particle size distribution. Unlike many available catalyst systems, the disclosed catalyst system does not use an inert support like silica, nor are MAO and other similar activators needed in the catalyst system.

While not wishing to be bound by theory, it is believed that many of the gels resulting from dual metallocene-based bimodal polymers are due to the large difference in viscosity that can arise between the flow characteristics of the polymer fraction produced from one catalyst and the flow characteristics of the polymer fraction produced from the other catalyst. It was found that the particle size of the solid activator (and thus, the particle size of the supported metallocene catalyst) can impact the relative amounts of each metallocene compound on the solid activator. For instance, metallocene compound 1 may react quicker with the solid activator during catalyst preparation, and thus preferentially, the smaller activator particles may contain relatively more metallocene compound 1 and the larger activator particles may contain relatively more metallocene compound 2. Thus, in addition to gels, the particle size distribution also can significantly impact polymer properties, such as polymer molecular weight distribution and rheological properties in both the low and high shear regions. For instance, it was found that larger solid activator particles (and thus larger supported metallocene catalyst particles) often result in polymer particles with much higher viscosities and molecular weights than smaller particles.

By controlling the particle size distribution of the activator (and the supported metallocene catalyst), more consistent polymer particle sizes (in powder or fluff form) can be produced, thereby resulting in ethylene polymers with a unique combination of density, melt flow, and molecular weight properties, while also minimizing gels and improving impact strength.

Catalyst Compositions

Disclosed herein are catalyst compositions comprising a metallocene compound, a solid activator, and optionally, a co-catalyst. The solid activator (or the supported metallocene catalyst) can be characterized by a d50 average particle size in a range from 15 to 50 µm and a particle size span ((d90-d10)/d50) in a range from 0.5 to 1.5. Referring first to the solid activator, which can comprise a solid oxide treated with an electron-withdrawing anion, examples of such materials are disclosed in, for instance, U.S. Pat. Nos. 7,294,599, 7,601,665, 7,884,163, 8,309,485, 8,623,973, and 9,023,959, which are incorporated herein by reference in their entirety. For instance, the solid activator can comprise fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided-chlorided silica-coated alumina, fluorided silica-coated alumina, sulfated silica-coated alumina, or phosphated silica-coated alumina, and the like, as well as any combination thereof.

In one aspect, the solid activator can comprise fluorided alumina, sulfated alumina, fluorided silica-alumina, sulfated silica-alumina, fluorided silica-coated alumina, fluorided-chlorided silica-coated alumina, sulfated silica-coated alumina, or any combination thereof. In another aspect, the solid activator can comprise fluorided alumina; alternatively, sulfated alumina; alternatively, fluorided silica-alumina; alternatively, sulfated silica-alumina; alternatively, fluorided silica-coated alumina; alternatively, fluorided-chlorided silica-coated alumina; or alternatively, sulfated silica-coated alumina. In yet another aspect, the solid activator can comprise a fluorided solid oxide and/or a sulfated solid oxide.

Various processes can be used to form solid activators useful in the present invention. Methods of contacting the solid oxide with the electron-withdrawing component, suitable electron withdrawing components and addition amounts, impregnation with metals or metal ions (e.g., zinc, nickel, vanadium, titanium, silver, copper, gallium, tin, tungsten, molybdenum, zirconium, and the like, or combinations thereof), and various calcining procedures and conditions are disclosed in, for example, U.S. Pat. Nos. 6,107,230, 6,165,929, 6,294,494, 6,300,271, 6,316,553, 6,355,594, 6,376,415, 6,388,017, 6,391,816, 6,395,666, 6,524,987, 6,548,441, 6,548,442, 6,576,583, 6,613,712, 6,632,894, 6,667,274, 6,750,302, 7,294,599, 7,601,665, 7,884,163, and 8,309,485, which are incorporated herein by reference in their entirety. Other suitable processes and procedures for preparing solid activators (e.g., fluorided solid oxides, sulfated solid oxides, etc.) are well known to those of skill in the art.

The catalyst composition can contain a co-catalyst. When present, the co-catalyst can include, but is not limited to, metal alkyl, or organometal, co-catalysts, with the metal encompassing boron, aluminum, zinc, and the like. Optionally, the catalyst systems provided herein can comprise a co-catalyst, or a combination of co-catalysts. For instance, alkyl boron, alkyl aluminum, and alkyl zinc compounds often can be used as co-catalysts in such catalyst systems. Representative boron compounds can include, but are not limited to, tri-n-butyl borane, tripropylborane, triethylborane, and the like, and this include combinations of two or more of these materials. While not being limited thereto, representative aluminum compounds (e.g., organoaluminum compounds) can include trimethylaluminum (TMA), triethylaluminum (TEA), tri-n-propylaluminum, tri-n-butylaluminum, triisobutylaluminum (TIBA), tri-n-hexylaluminum, tri-n-octylaluminum, diisobutylaluminum hydride, diethylaluminum ethoxide, diethylaluminum chloride, and the like, as well as any combination thereof. Exemplary zinc compounds (e.g., organozinc compounds) that can be used as co-catalysts can include, but are not limited to, dimethylzinc, diethylzinc, dipropylzinc, dibutylzinc, dineopentylzinc, di(trimethylsilyl)zinc, di(triethylsilyl)zinc, di(triisoproplysilyl)zinc, di(triphenylsilyl)zinc, di(allyldimethylsilyl)zinc, di(trimethylsilylmethyl)zinc, and the like, or combinations thereof. Accordingly, in an aspect of this invention, the catalyst composition can comprise the metallocene compound (one or more than one), the solid activator, and an organoaluminum compound, such as TMA, TEA, TIBA, and the like, or any combination thereof.

Consistent with this disclosure, the catalyst composition can contain a single metallocene compound, for example, any suitable bridged metallocene compound or any suitable unbridged metallocene compound, or any bridged metallocene compound or any unbridged metallocene compound disclosed herein. Alternatively, the catalyst composition can be a dual catalyst system. In such instances, the catalyst composition can contain metallocene component I comprising any suitable unbridged metallocene compound or any disclosed herein and metallocene component II comprising any suitable bridged metallocene compound or any disclosed herein. Whether the catalyst compositions contains a single metallocene compound, two metallocene compounds, or more than two metallocene compounds, the catalyst composition also can contain any suitable solid activator or any solid activator disclosed herein (one or more than one), and optionally, any suitable co-catalyst or any co-catalyst disclosed herein (one or more than one).

Referring first to metallocene component I, which often can comprise an unbridged zirconium or hafnium based metallocene compound containing two cyclopentadienyl groups, two indenyl groups, or a cyclopentadienyl and an indenyl group. In one aspect, metallocene component I can comprise an unbridged zirconium or hafnium based metallocene compound containing two cyclopentadienyl groups. In another aspect, metallocene component I can comprise an unbridged zirconium or hafnium based metallocene compound containing two indenyl groups. In yet another aspect, metallocene component I can comprise an unbridged zirconium or hafnium based metallocene compound containing a cyclopentadienyl group and an indenyl group. In still another aspect, metallocene component I can comprise an unbridged zirconium based metallocene compound containing an alkyl-substituted cyclopentadienyl group and an alkenyl-substituted indenyl group.

Metallocene component I can comprise, in particular aspects of this invention, an unbridged metallocene compound having formula (I):

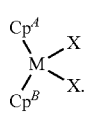

(I)

Within formula (I), M, $Cp^A$, $Cp^B$, and each X are independent elements of the unbridged metallocene compound. Accordingly, the unbridged metallocene compound having formula (I) can be described using any combination of M, $Cp^A$, $Cp^B$, and X disclosed herein. Unless otherwise specified, formula (I) above, any other structural formulas disclosed herein, and any metallocene complex, compound, or species disclosed herein are not designed to show stereochemistry or isomeric positioning of the different moieties (e.g., these formulas are not intended to display cis or trans isomers, or R or S diastereoisomers), although such compounds are contemplated and encompassed by these formulas and/or structures.

In accordance with aspects of this invention, the metal in formula (I), M, can be Zr or Hf. Thus, M can be Zr in one aspect, and M can be Hf in another aspect. Each X in formula (I) independently can be a monoanionic ligand. In some aspects, suitable monoanionic ligands can include, but are not limited to, H (hydride), $BH_4$, a halide, a $C_1$ to $C_{36}$ hydrocarbyl group, a $C_1$ to $C_{36}$ hydrocarboxy group, a $C_1$ to $C_{36}$ hydrocarbylaminyl group, a $C_1$ to $C_{36}$ hydrocarbylsilyl group, a $C_1$ to $C_{36}$ hydrocarbylaminylsilyl group, $-OBR^1_2$, or $-OSO_2R^1$, wherein $R^1$ is a $C_1$ to $C_{36}$ hydrocarbyl group. It is contemplated that each X can be either the same or a different monoanionic ligand. Suitable hydrocarbyl groups, hydrocarboxy groups, hydrocarbylaminyl groups, hydrocarbylsilyl groups, and hydrocarbylaminylsilyl groups are disclosed, for example, in U.S. Pat. No. 9,758,600, incorporated herein by reference in its entirety.

Generally, the hydrocarbyl group which can be an X in formula (I) can be a $C_1$ to $C_{36}$ hydrocarbyl group, including a $C_1$ to $C_{36}$ alkyl group, a $C_2$ to $C_{36}$ alkenyl group, a $C_4$ to $C_{36}$ cycloalkyl group, a $C_6$ to $C_{36}$ aryl group, or a $C_7$ to $C_{36}$ aralkyl group. For instance, each X independently can be a $C_1$ to $C_{18}$ alkyl group, a $C_2$ to $C_{18}$ alkenyl group, a $C_4$ to $C_{18}$ cycloalkyl group, a $C_6$ to $C_{18}$ aryl group, or a $C_7$ to $C_{18}$ aralkyl group: alternatively, each X independently can be a $C_1$ to $C_{12}$ alkyl group, a $C_2$ to $C_{12}$ alkenyl group, a $C_4$ to $C_{12}$ cycloalkyl group, a $C_6$ to $C_{12}$ aryl group, or a $C_7$ to $C_{12}$ aralkyl group; alternatively, each X independently can be a $C_1$ to $C_{10}$ alkyl group, a $C_2$ to $C_{10}$ alkenyl group, a $C_4$ to $C_{10}$ cycloalkyl group, a $C_6$ to $C_{10}$ aryl group, or a $C_7$ to $C_{10}$ aralkyl group; or alternatively, each X independently can be a $C_1$ to $C_5$ alkyl group, a $C_2$ to $C_5$ alkenyl group, a $C_5$ to $C_8$ cycloalkyl group, a $C_6$ to $C_8$ aryl group, or a $C_7$ to $C_8$ aralkyl group.

In particular aspects of this invention, each X independently can be a halide or a $C_1$ to $C_{18}$ hydrocarbyl group. For instance, each X can be Cl.

In formula (I). $Cp^A$ and $Cp^B$ independently can be a substituted or unsubstituted cyclopentadienyl or indenyl group. In one aspect, $Cp^A$ and $Cp^B$ independently can be an unsubstituted cyclopentadienyl or indenyl group. Alternatively, $Cp^A$ and $Cp^B$ independently can be a substituted indenyl or cyclopentadienyl group, for example, having up to 5 substituents.

If present, each substituent on $Cp^A$ and $Cp^B$ independently can be H, a halide, a $C_1$ to $C_{36}$ hydrocarbyl group, a $C_1$ to $C_{36}$ halogenated hydrocarbyl group, a $C_1$ to $C_{36}$ hydrocarboxy group, or a $C_1$ to $C_{36}$ hydrocarbylsilyl group. Importantly, each substituent on $Cp^A$ and/or $Cp^B$ can be either the same or a different substituent group. Moreover, each substituent can be at any position on the respective cyclopentadienyl or indenyl ring structure that conforms with the rules of chemical valence. In an aspect, the number of substituents on $Cp^A$ and/or on $Cp^B$ and/or the positions of each substituent on $Cp^A$ and/or on $Cp^B$ are independent of each other. For instance, two or more substituents on $Cp^A$ can be different, or alternatively, each substituent on $Cp^A$ can be the same. Additionally or alternatively, two or more substituents on $Cp^B$ can be different, or alternatively, all substituents on $Cp^B$ can be the same. In another aspect, one or more of the substituents on $Cp^A$ can be different from the one or more of the substituents on $Cp^B$, or alternatively, all substituents on both $Cp^A$ and/or on $Cp^B$ can be the same. In these and other aspects, each substituent can be at any position on the respective cyclopentadienyl or indenyl ring structure. If substituted, $Cp^A$ and/or $Cp^B$ independently can have one substituent, or two substituents, or three substituents, or four substituents, and so forth.

Suitable hydrocarbyl groups, halogenated hydrocarbyl groups, hydrocarboxy groups, and hydrocarbylsilyl groups that can be substituents are disclosed, for example, in U.S. Pat. No. 9,758,600, incorporated herein by reference in its entirety. For instance, the halogenated hydrocarbyl group indicates the presence of one or more halogen atoms replacing an equivalent number of hydrogen atoms in the hydrocarbyl group. The halogenated hydrocarbyl group often can be a halogenated alkyl group, a halogenated alkenyl group, a halogenated cycloalkyl group, a halogenated aryl group, or a halogenated aralkyl group. Representative and non-limiting halogenated hydrocarbyl groups include pentafluorophenyl, trifluoromethyl ($CF_3$), and the like.

Illustrative and non-limiting examples of unbridged metallocene compounds having formula (I) and/or suitable for use as metallocene component I can include the following compounds (Ph=phenyl):
(1)
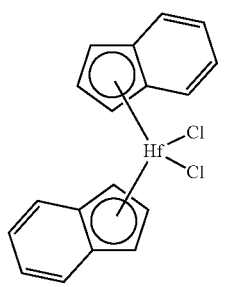
(2)
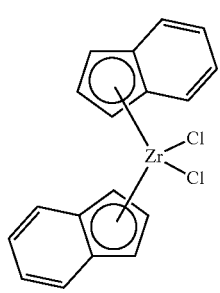
(3)
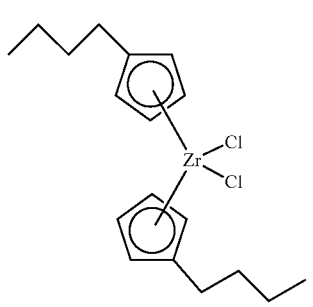
(4)
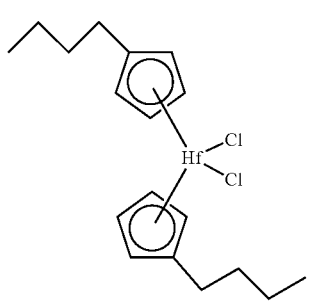
(5)
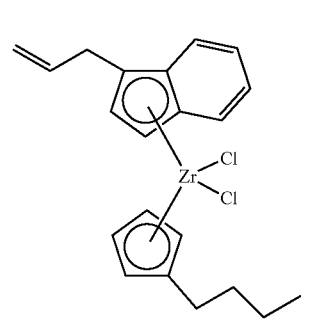
(6)
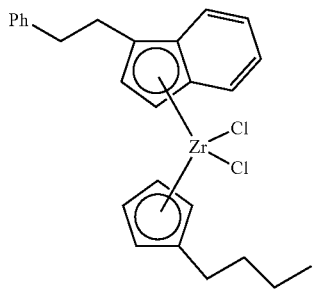
(7)
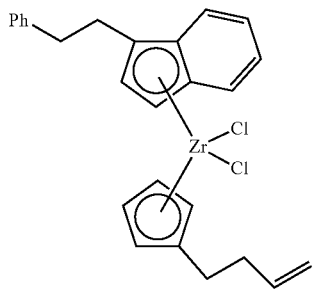
(8)
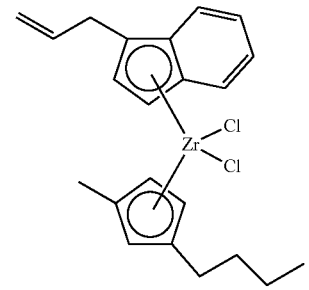
(9)
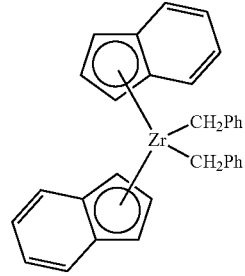
(10)
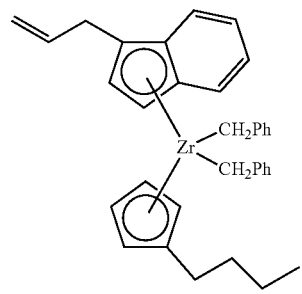

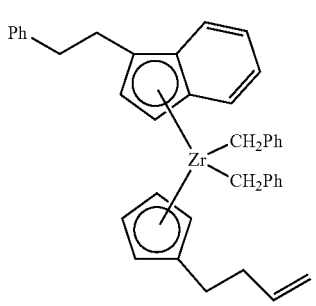

(11)

and the like, as well as combinations thereof.

Metallocene component I is not limited solely to unbridged metallocene compounds such as described above. Other suitable unbridged metallocene compounds are disclosed in U.S. Pat. Nos. 7,199,073, 7,226,886, 7,312,283, and 7,619,047, which are incorporated herein by reference in their entirety.

Referring now to metallocene component II, which can be a bridged metallocene compound. In one aspect, for instance, metallocene component II can comprise a bridged zirconium or hafnium based metallocene compound. In another aspect, metallocene component II can comprise a bridged zirconium or hafnium based metallocene compound with an alkenyl substituent. In yet another aspect, metallocene component II can comprise a bridged zirconium or hafnium based metallocene compound with an alkenyl substituent and a fluorenyl group. In still another aspect, metallocene component II can comprise a bridged zirconium or hafnium based metallocene compound with a cyclopentadienyl group and a fluorenyl group, and with an alkenyl substituent on the bridging group and/or on the cyclopentadienyl group. Further, metallocene component II can comprise a bridged metallocene compound having an aryl group substituent on the bridging group.

Metallocene component II can comprise, in particular aspects of this invention, a bridged metallocene compound having formula (II):

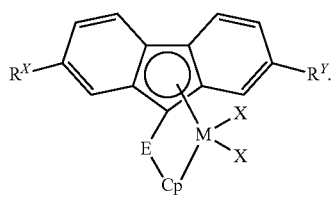

(II)

Within formula (II), M, Cp, $R^X$, $R^Y$, E, and each X are independent elements of the bridged metallocene compound. Accordingly, the bridged metallocene compound having formula (II) can be described using any combination of M, Cp, $R^X$, $R^Y$, E, and X disclosed herein. The selections for M and each X in formula (II) are the same as those described herein above for formula (I). In formula (II), Cp can be a substituted cyclopentadienyl, indenyl, or fluorenyl group. In one aspect. Cp can be a substituted cyclopentadienyl group, while in another aspect. Cp can be a substituted indenyl group.

In some aspects, Cp can contain no additional substituents, e.g., other than bridging group E, discussed further herein below. In other aspects, Cp can be further substituted with one substituent, or two substituents, or three substituents, or four substituents, and so forth. If present, each substituent on Cp independently can be H, a halide, a $C_1$ to $C_{36}$ hydrocarbyl group, a $C_1$ to $C_{36}$ halogenated hydrocarbyl group, a $C_1$ to $C_{36}$ hydrocarboxy group, or a $C_1$ to $C_{36}$ hydrocarbylsilyl group. Importantly, each substituent on Cp can be either the same or a different substituent group. Moreover, each substituent can be at any position on the respective cyclopentadienyl, indenyl, or fluorenyl ring structure that conforms with the rules of chemical valence. In general, any substituent on Cp, independently, can be H or any halide, $C_1$ to $C_{36}$ hydrocarbyl group, $C_1$ to $C_{36}$ halogenated hydrocarbyl group, $C_1$ to $C_{36}$ hydrocarboxy group, or $C_1$ to $C_{36}$ hydrocarbylsilyl group described herein (e.g., as pertaining to substituents on $Cp^A$ and $Cp^B$ in formula (I)).

Similarly, $R^X$ and $R^Y$ in formula (II) independently can be H or any halide, $C_1$ to $C_6$ hydrocarbyl group, $C_1$ to $C_{36}$ halogenated hydrocarbyl group, $C_1$ to $C_{36}$ hydrocarboxy group, or $C_1$ to $C_{36}$ hydrocarbylsilyl group disclosed herein (e.g., as pertaining to substituents on $Cp^A$ and $Cp^B$ in formula (I)). In one aspect, for example, $R^X$ and $R^Y$ independently can be H or a $C_1$ to $C_{12}$ hydrocarbyl group. In another aspect, $R^X$ and $R^Y$ independently can be a $C_1$ to $C_{10}$ hydrocarbyl group. In yet another aspect, $R^X$ and $R^Y$ independently can be H, Cl, $CF_3$, a methyl group, an ethyl group, a propyl group, a butyl group (e.g., t-Bu), a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group, a benzyl group, a naphthyl group, a trimethylsilyl group, a triisopropylsilyl group, a triphenylsilyl group, or an allyldimethylsilyl group, and the like. In still another aspect, $R^X$ and $R^Y$ independently can be a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group, or a benzyl group.

Bridging group E in formula (II) can be a bridging group having the formula $>E^A R^A R^B$, wherein $E^A$ can be C, Si, or Ge, and $R^A$ and $R^B$ independently can be H or a $C_1$ to $C_{18}$ hydrocarbyl group. In some aspects of this invention, $R^A$ and $R^B$ independently can be a $C_1$ to $C_{12}$ hydrocarbyl group; alternatively, $R^A$ and $R^B$ independently can be a $C_1$ to $C_8$ hydrocarbyl group; alternatively, $R^A$ and $R^B$ independently can be a phenyl group, a $C_1$ to $C_8$ alkyl group, or a $C_3$ to $C_8$ alkenyl group; alternatively, $R^A$ and $R^B$ independently can be a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a cyclohexylphenyl group, a naphthyl group, a tolyl group, or a benzyl group; or alternatively, $R^A$ and $R^B$ independently can be a methyl group, an ethyl group, a propyl group, a butyl group, a pentyl group, a hexyl group, a propenyl group, a butenyl group, a pentenyl group, a hexenyl group, a phenyl group, or a benzyl group. In these and other aspects, $R^A$ and $R^B$ can be either the same or different.

Illustrative and non-limiting examples of bridged metallocene compounds having formula (II) and/or suitable for use as metallocene component II can include the following compounds (Me=methyl, Ph=phenyl; t-Bu=tert-butyl):

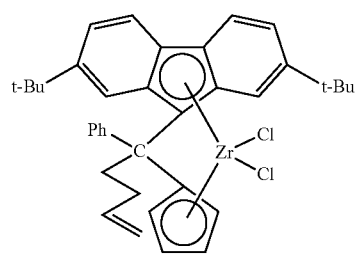
(14)
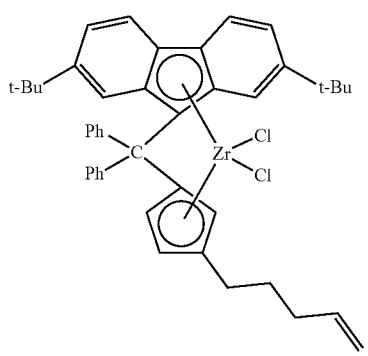
(15)
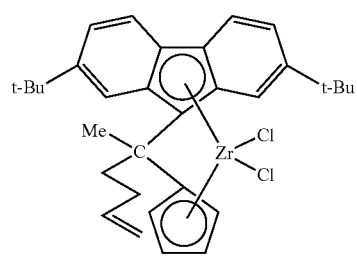
(16)
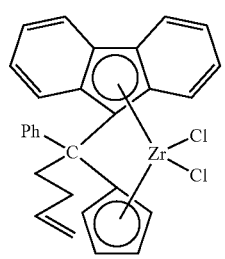
(17)
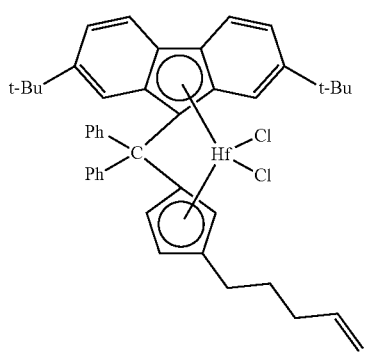
(18)
-continued
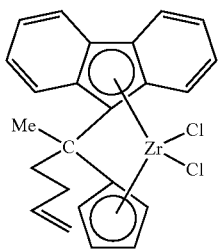
(19)
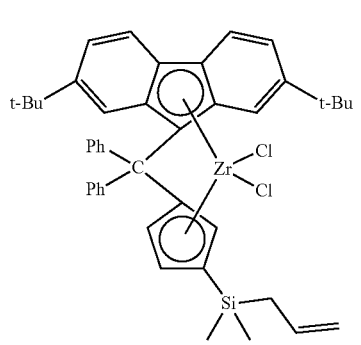
(20)
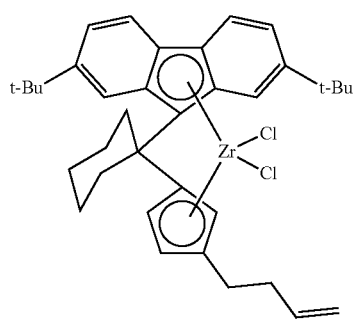
(21)
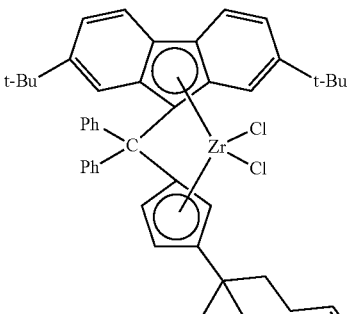
(22)
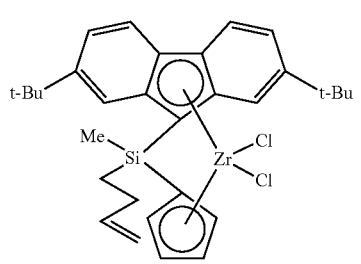
(23)

-continued

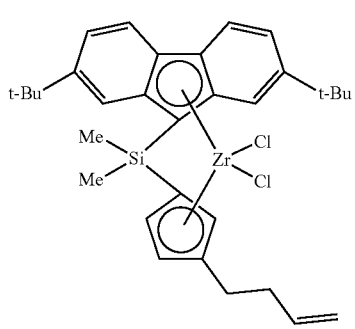

(24)

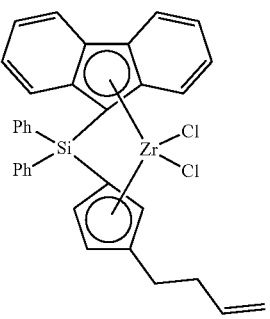

(25)

and the like, as well as combinations thereof.

Metallocene component II is not limited solely to the bridged metallocene compounds such as described above. Other suitable bridged metallocene compounds are disclosed in U.S. Pat. Nos. 7,026,494, 7,041,617, 7,226,886, 7,312,283, 7,517,939, and 7,619,047, which are incorporated herein by reference in their entirety.

According to an aspect of this invention, the weight ratio of metallocene component I to metallocene component II in the catalyst composition can be in a range from 10:1 to 1:10, from 8:1 to 1:8, from 5:1 to 1:5, from 4:1 to 1:4, from 3:1 to 1:3; from 2:1 to 1:2, from 1.5:1 to 1:1.5, from 1.25:1 to 1:1.25, or from 1.1:1 to 1:1.1. In another aspect, metallocene component I is the major component of the catalyst composition, and in such aspects, the weight ratio of metallocene component I to metallocene component II in the catalyst composition can be in a range from 10:1 to 1:1, from 5:1 to 1.1:1, from 2:1 to 1.1:1, or from 1.8:1 to 1.1:1.

It is contemplated herein that the catalyst composition can comprise a metallocene compound (or metallocene component I and metallocene component II), a solid activator, and a co-catalyst (e.g., an organoaluminum compound), wherein this catalyst composition is substantially free of aluminoxanes, organoboron or organoborate compounds, ionizing ionic compounds, and/or other similar materials; alternatively, substantially free of aluminoxanes, alternatively, substantially free or organoboron or organoborate compounds; or alternatively, substantially free of ionizing ionic compounds. In these aspects, the catalyst composition has catalyst activity, discussed herein, in the absence of these additional materials. For example, a catalyst composition of the present invention can consist essentially of the metallocene compound (or metallocene component I and metallocene component II), the solid activator, and the organoaluminum compound, wherein no other materials are present in the catalyst composition which would increase/decrease the activity of the catalyst composition by more than 10% from the catalyst activity of the catalyst composition in the absence of said materials.

Catalyst compositions of the present invention generally have a catalyst activity greater than 150 grams of ethylene polymer (homopolymer and/or copolymer, as the context requires) per gram of solid activator per hour (abbreviated g/g/hr). In another aspect, the catalyst activity can be greater than 250, greater than 350, or greater than 500 g/g/hr. Yet, in another aspect, the catalyst activity can be greater than 700 g/g/hr, greater than 1000 g/g/hr, or greater than 2000 g/g/hr. and often as high as 5000-10,000 g/g/hr. Illustrative and non-limiting ranges for the catalyst activity include from 150 to 10,000, from 500 to 7500, or from 1000 to 5000 g/g/hr, and the like. These activities are measured under slurry polymerization conditions, with a triisobutylaluminum co-catalyst, using isobutane as the diluent, at a polymerization temperature of 95° C. and a reactor pressure of 590 psig. Moreover, in some aspects, the solid activator comprise sulfated alumina, fluorided silica-alumina, or fluorided silica-coated alumina, although not limited thereto.

This invention further encompasses methods of making these catalyst compositions, such as, for example, contacting the respective catalyst components in any order or sequence. In one aspect, for example, the catalyst composition can be produced by a process comprising contacting, in any order, the metallocene compound, the solid activator, and the co-catalyst, while in another aspect, the catalyst composition can be produced by a process comprising contacting, in any order, metallocene component I, metallocene component II, the solid activator, and the co-catalyst.

In the catalyst compositions disclosed herein, the solid activator (or the supported metallocene catalyst) can be characterized by a d50 average particle size in a range from 15 to 50 µm and a particle size span ((d90-d10)/d50) in a range from 0.5 to 1.5. In one aspect, the d50 average particle size can be in a range from 15 to 40 µm or from 15 to 25 µm, while in another aspect, the d50 particle size can be from 20 to 30 µm, and in another aspect, the d50 particle size can be from 17 to 40 µm or from 17 to 27 µm, and in still another aspect, the d50 particle size can be from 17 to 25 µm. Likewise, the span ((d90-d10)/d50) can be in a range from 0.5 to 1.2 in one aspect, from 0.6 to 1.4 or from 0.6 to 1.3 in another aspect, from 0.6 to 1.1 in yet another aspect, and from 0.7 to 1.4 or from 0.7 to 1.2 in still another aspect. The solid activator (or the supported metallocene catalyst) also can have any of the particle attributes listed below and in any combination, unless indicated otherwise.

The solid activator (or the supported metallocene catalyst) can have a d10 particle size of greater than or equal to 10 µm; alternatively, greater than or equal to 11 µm; alternatively, greater than or equal to 12 µm; alternatively, in a range from 10 to 20 µm; or alternatively in a range from 10 to 18 µm. Additionally or alternatively, the solid activator (or the supported metallocene catalyst) can have a d95 particle size of less than or equal to 65 µm; alternatively, less than or equal to 60 µm; alternatively, in a range from 25 to 65 µm; or alternatively, in a range from 28 to 60 µm.

While not limited thereto, the solid activator (or the supported metallocene catalyst) can be further characterized by a ratio of d90/d10, which often ranges from 1.5 to 5. In some aspects, the ratio of d90/d10 can be from 1.5 to 4, from 1.5 to 3, from 1.8 to 5, from 1.8 to 4, or from 1.8 to 3.

Typically, a very small amount of the solid activator (or the supported metallocene catalyst) has a particle size of less than 10 µm. In one aspect, the amount is less than or equal to 15% or less than or equal to 10%, while in another aspect, the amount is less than or equal to 8% or less than or equal to 5%, and in yet another aspect, the amount is less than or equal to 2%. Likewise, a very small amount of the solid activator (or the supported metallocene catalyst) has a particle size of greater than 45 µm. In one aspect, the amount is less than or equal to 20%, while in another aspect, the amount is less than or equal to 15% or less than or equal to 10%, and in yet another aspect, the amount is less than or equal to 5% or less than or equal to 2%. In contrast, a vast majority of the solid activator (or the supported metallocene catalyst) has a particle size of less than 50 µm. For instance, at least 85% of the solid activator (or the supported metallocene catalyst) has a particle size of less than 50 µm, while in further aspects, the amount of the solid activator (or the supported metallocene catalyst) with a particle size of less than 50 µm can be at least 88%, at least 900%, or at least 95%.

Polymerization Processes

Olefin polymers (e.g., ethylene polymers) can be produced from the disclosed metallocene catalyst compositions using any suitable polymerization process using various types of polymerization reactors, polymerization reactor systems, and polymerization reaction conditions. A polymerization process can comprise contacting the catalyst composition (any metallocene-based catalyst composition disclosed herein) with an olefin monomer and an optional olefin comonomer in a polymerization reactor system comprising a loop slurry reactor under polymerization conditions to produce an olefin polymer. This invention also encompasses any olefin polymers (e.g., ethylene polymers) produced by the polymerization processes disclosed herein.

In one aspect, the polymerization reactor system can comprise only one loop slurry reactor (a single loop slurry reactor). However, in another aspect, the polymerization reactor system can comprise two or more reactors, at least one of which is the loop slurry reactor. The other reactor(s) in the polymerization reactor system can be another slurry reactor (dual loop slurry), a gas-phase reactor, a solution reactor, or a combination thereof. The production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. The multiple reactors can be operated in series, in parallel, or both. Accordingly, the present invention encompasses polymerization reactor systems comprising a single reactor, comprising two reactors, and comprising more than two reactors, wherein at least one is a loop slurry reactor.

In a loop slurry reactor, monomer, diluent, catalyst system, and comonomer (if used) can be continuously fed to a loop reactor where polymerization occurs. Generally, continuous processes can comprise the continuous introduction of monomer/comonomer, a catalyst system, and a diluent into a polymerization reactor and the continuous removal from this reactor of a suspension comprising polymer particles (powder or fluff) and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565.175, 5,575,979, 6,239,235, 6,262,191, 6,833,415, and 8,822,608, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used.

The polymerization reactor system can further comprise any combination of at least one raw material feed system, at least one feed system for the catalyst system or catalyst components, and/or at least one polymer recovery system. Suitable reactor systems can further comprise systems for feedstock purification, catalyst storage and preparation, extrusion, reactor cooling, polymer recovery, fractionation, recycle, storage, loadout, laboratory analysis, and process control. Depending upon the desired properties of the olefin polymer, hydrogen can be added to the polymerization reactor system as needed (e.g., continuously, pulsed, etc.).

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. Various polymerization conditions can be held substantially constant, for example, for the production of a particular grade of the olefin polymer (or ethylene polymer). A suitable polymerization temperature can be any temperature below the de-polymerization temperature according to the Gibbs Free energy equation. Typically, this includes from 60° C. to 280° C., for example, or from 60° C. to 120° C., depending upon the type of polymerization reactor. In some loop reactor systems, the polymerization temperature generally can be within a range from 70° C. to 100° C., or from 75° C. to 95° C. Suitable pressures will also vary according to the reactor and polymerization type. The pressure for liquid phase polymerizations in a loop reactor is typically less than 1000 psig (6.9 MPa) and greater than 200 psig (1.4 MPa).

Olefin monomers that can be employed with the catalyst compositions and slurry-based polymerization processes of this invention typically can include olefin compounds having from 2 to 30 carbon atoms per molecule and having at least one olefinic double bond, such as ethylene or propylene. In an aspect, the olefin monomer can comprise a $C_2$-$C_{20}$ olefin; alternatively, a $C_2$-$C_{20}$ alpha-olefin; alternatively, a $C_2$-$C_{10}$ olefin; alternatively, a $C_2$-$C_{10}$ alpha-olefin; alternatively, the olefin monomer can comprise ethylene; or alternatively, the olefin monomer can comprise propylene (e.g., to produce a polypropylene homopolymer or a propylene-based copolymer).

When a copolymer (or alternatively, a terpolymer) is desired, the olefin monomer and the olefin comonomer independently can comprise, for example, a $C_2$-$C_{20}$ alpha-olefin. In some aspects, the olefin monomer can comprise ethylene or propylene, which is copolymerized with at least one comonomer (e.g., a $C_2$-$C_{20}$ alpha-olefin, a $C_3$-$C_{20}$ alpha-olefin, etc.). According to one aspect of this invention, the olefin monomer used in the polymerization process can comprise ethylene. In this aspect, the comonomer can comprise a $C_3$-$C_{10}$ alpha-olefin; alternatively, the comonomer can comprise 1-butene, 1-pentene, 1-hexene, 1-octene, 1-decene, styrene, or any combination thereof; alternatively, the comonomer can comprise 1-butene, 1-hexene, 1-octene, or any combination thereof; alternatively, the comonomer can comprise 1-butene; alternatively, the comonomer can comprise 1-hexene; or alternatively, the comonomer can comprise 1-octene.

An illustrative and non-limiting example of an ethylene polymer composition that can be produced using the catalysts and processes disclosed herein can have a d50 average particle size in a range from 150 to 600 µm, a particle size span ((d90-d10)/d50) in a range from 0.5 to 1.6, less than or equal to 20% of the composition with a particle size of less than 100 µm, and less than or equal to 5% of the composition with a particle size of greater than 1000 µm. The ethylene polymer composition can be in powder form (also referred to as fluff), prior to mixing and homogenizing to form typical resin pellets or beads.

Often, the d50 average particle size can fall within a range from 150 to 450 µm, from 150 to 325 µm, from 150 to 300 µm, from 175 to 325 µm, from 175 to 275 µm, from 200 to 400 µm, or from 200 to 275 µm, and the span ((d90-d10)/d50) can fall within a range from 0.75 to 1.5, from 1 to 1.6, from 1.1 to 1.6, or from 1.1 to 1.5. Additionally or alternatively, the amount of the composition having a particle size of greater than 1000 µm can be less than or equal to 5%, such as less than or equal to 3%, less than or equal to 2%, or less than or equal to 1%. Additionally or alternatively, the amount of the composition having a particle size of less than 100 µm can be less than or equal to 20%, such as less than or equal to 10%, less than or equal to 5%, from 1 to 10%, or from 1 to 5%.

Optionally, the ethylene polymer composition (in powder or fluff form) can be further characterized by a d90 particle size from 300 to 800 µm (e.g., from 300 to 600 µm, from 350 to 550 µm, from 375 to 525 µm, from 400 to 750 µm, or from 400 to 500 µm) and/or by a ratio of d90/d10 from 2 to 5 (e.g., from 2 to 4, from 2.2 to 3.8, from 2.4 to 5, from 2.4 to 3.6, or from 2.7 to 3.3).

While not limited thereto, the HLMI of the composition can be in a range from 4 to 10 g/10 min; alternatively, from 4 to 9 g/10 min; alternatively, from 4 to 8 g/10 min; alternatively, from 5 to 10 g/10 min; alternatively, from 5 to 9 g/10 min; or alternatively, from 5 to 8 g/10 min. Likewise, the density of the composition is not particularly limited, generally ranging from 0.944 to 0.955 g/cm$^3$, and additional illustrative ranges include from 0.944 to 0.952, from 0.945 to 0.955, from 0.945 to 0.953, from 0.945 to 0.95, from 0.946 to 0.955, or from 0.946 to 0.952 g/cm$^3$, and the like.

It should be noted that the metallocene-based catalysts produced by the solid activators of this invention tend to produce a more homogeneous distribution of polymer particles, in terms of size and also in terms of comonomer incorporation. The narrow distribution of polymer particle size significantly helps the flow of the polymer powder, reducing fouling, packing, and enhancing transfer in downstream operations. This is partly because the polymer powder has less tendency to segregate upon handling. In segregation test ASTM 6941, this results in less than 10%, and in some cases, less than 7%, less than 5% or less than 3% change in the mean size in samples taken from the top to the bottom of the settled polymer bed. Similarly, the change in d10 value from top to bottom is less than 20%, and more often can be less than 15%, less than 10%, or less than 7%. Likewise, the change in d90 value can be less than 5%; alternatively, less than 3%; or alternatively, less than 2%.

The coefficient of variation in the segregation test for the mean should be less than 7%, and can be less than 6%, less than 5%, less than 4%, or less than 3%, in some aspects. For the d10 value, it should be less than 25%, and can be less than 20%, less than 15%, less than 10%, or less than 7%, in some aspects. For the d90, the coefficient of variation should be less than 5%, and can be less than 4%, or less than 3%, in some aspects. Further, for the d50 value, the coefficient of variation should be less than 8%, and can be less than 7%, less than 6%, less than 5%, less than 4%, or less than 3%, in some aspects.

Another consequence of polymer particle heterogeneity is that the density of each particle can vary widely. However, the polymer particles (also referred to as powder or fluff) of this invention vary less than 0.035 g/cm$^3$ in one aspect, less than 0.03 g/cm$^3$ in another aspect, less than 0.02 g/cm$^3$ in another aspect, less than 0.015 g/cm$^3$ in another aspect, less than 0.01 g/cm$^3$ in yet another aspect, or less than 0.006 g/cm$^3$ in still another aspect.

Olefin Polymers

This invention is also directed to, and encompasses, the olefin polymers produced by any of the polymerization processes disclosed herein. Olefin polymers encompassed herein can include any polymer produced from any olefin monomer and optional comonomer(s) described herein. For example, the olefin polymer can comprise an ethylene homopolymer, an ethylene copolymer (e.g., ethylene/α-olefin, ethylene/1-butene, ethylene/1-hexene, ethylene/1-octene, etc.), a propylene homopolymer, a propylene copolymer, an ethylene terpolymer, a propylene terpolymer, and the like, including any combinations thereof. In one aspect, the olefin polymer can comprise an ethylene homopolymer, an ethylene/1-butene copolymer, an ethylene/1-hexene copolymer, and/or an ethylene/1-octene copolymer, while in another aspect, the olefin polymer can comprise an ethylene/1-hexene copolymer.

If the resultant polymer produced in accordance with the present invention is, for example, an ethylene polymer, its properties can be characterized by various analytical techniques known and used in the polyolefin industry. Articles of manufacture can be formed from, and/or can comprise, the olefin polymers (e.g., ethylene polymers) of this invention, whose typical properties are provided below.

The densities of ethylene-based polymers disclosed herein often are greater than or equal to 0.90 g/cm$^3$, and less than or equal to 0.97 g/cm$^3$. Yet, in particular aspects, the density can be in a range from 0.91 to 0.965 g/cm$^3$, from 0.92 to 0.96 g/cm$^3$, from 0.93 to 0.955 g/cm$^3$, or from 0.94 to 0.955 g/cm$^3$. While not being limited thereto, the ethylene polymer can have a high load melt index (HLMI) in a range from 0 to 100 g/10 min; alternatively, from 1 to 80 g/10 min; alternatively, from 2 to 40 g/10 min; alternatively, from 2 to 30 g/10 min; alternatively, from 1 to 20 g/10 min; or alternatively, from 50 to 100 g/10 min. In an aspect, ethylene polymers described herein can have a ratio of Mw/Mn, or the polydispersity index, in a range from 2 to 40, from 5 to 40, from 7 to 25, from 8 to 15, from 2 to 10, from 2 to 6, or from 2 to 4. Additionally or alternatively, the ethylene polymer can have a weight-average molecular weight (Mw) in a range from 75,000 to 700,000, from 75,000 to 200,000, from 100,000 to 500,000, from 150,000 to 350,000, or from 200,000 to 320,000 g/mol. Moreover, the olefin polymers can be produced with a single or dual metallocene catalyst system containing zirconium and/or hafnium. In such instances, the olefin or ethylene polymer can contain no measurable amount of Mg, V, Ti, and Cr, i.e., less than 0.1 ppm by weight. In further aspects, the olefin or ethylene polymer can contain, independently, less than 0.08 ppm, less than 0.05 ppm, or less than 0.03 ppm, of Mg, V, Ti, and Cr.

It was surprisingly found that the particular size distribution of the solid activator (and thus, the particle size distribution of the supported metallocene catalyst, for instance, containing two metallocene compounds) significantly impacts the molecular weight and rheological properties of the resulting ethylene polymer. For instance, it was found that larger solid activator particles (and thus larger supported metallocene catalyst particles) often result in polymer particles with higher viscosities and higher molecular weights than smaller particles, and further, these can often lead to gels due to their high viscosity and poor dispersibility.

An illustrative and non-limiting example of a particular ethylene polymer (e.g., an ethylene/α-olefin copolymer)—produced using the solid activator with a d50 from 15 to 50 µm and a particle size distribution from 0.5 to 1.5—has a high load melt index (HLMI) in a range from 4 to 10 g/10 min, a density in a range from 0.944 to 0.955 g/cm$^3$, and a higher molecular weight component and a lower molecular weight component. The higher molecular weight component can have a Mn in a range from 280,000 to 440,000 g/mol, while the lower molecular weight component can have a Mw in a range from 30,000 to 45,000 g/mol, and a ratio of Mz/Mw in a range from 2.3 to 3.4. While not limited thereto, the ethylene polymer can be in the form of pellets or beads. This illustrative and non-limiting example of a particular ethylene polymer consistent with the present invention also can have any of the polymer properties listed below and in any combination, unless indicated otherwise.

The ethylene polymer can comprise a high or higher molecular weight (HMW) component (or a first component) and a low or lower molecular weight (LMW) component (or a second component). These component terms are relative, are used in reference to each other, and are not limited to the actual molecular weights of the respective components. The molecular weight characteristics of these LMW and HMW components are determined by deconvoluting the composite (overall polymer) molecular weight distribution (e.g., determined using gel permeation chromatography). The amount of the lower molecular weight (LMW) component, based on the total polymer, is not limited to any particular range. Generally, however, the amount of the lower molecular weight component can be in a range from 56 to 72 wt. %, from 56 to 70 wt. %, from 58 to 72 wt. %, from 58 to 70 wt. %, or from 60 to 68 wt. %.

The higher molecular weight component can have a Mn in a range from 280,000 to 440,000 g/mol. For instance, the Mn can fall within a range from 280,000 to 425,000; alternatively, from 280.000 to 400,000; alternatively, from 290,000 to 410,000; alternatively, from 300,000 to 440.000, or alternatively, from 300,000 to 400,000 g/mol. Additionally or alternatively, the higher molecular weight component can have a relatively narrow molecular weight distribution, which can be quantified by a ratio of Mw/Mn in from 1.6 to 2.4 in one aspect, from 1.7 to 2.4 (or from 1.7 to 2.3) in another aspect, from 1.8 to 2.4 (or from 1.8 to 2.3) in yet another aspect, or from 1.9 to 2.4 (or from 1.9 to 2.3) in still another aspect. Additionally or alternatively, the higher molecular weight component can have a Mz in a range from 900.000 to 1,600,000 g/mol, although not limited thereto. Typical ranges for the Mz of the higher molecular weight component can include, but are not limited to, from 1,000,000 to 1,500,000, from 1,000,000 to 1,400,000, from 1,100,00) to 1,600,000, or from 1,100,000 to 1,500,000 g/mol.

The lower molecular weight component of the ethylene polymer can have a Mw in a range from 30,000 to 45,000 g/mol (or from 30,000 to 43,000, from 30,000 to 41,000, or from 31,000 to 45,000, or from 31,000 to 42.000, or from 31.000 to 40,000, or from 32,000 to 44,000, or from 32,000 to 42,000 g/mol), and a ratio of Mz/Mw in a range from 2.3 to 3.4 (or from 2.3 to 3.2, or from 2.35 to 3.0, or from 2.4 to 3.3, or from 2.4 to 3.2, or from 2.4 to 3.1). Additionally or alternatively, the lower molecular weight component can have a Mn that falls within a range from 4,000 to 10,000 g/mol, such as from 4,000 to 9,000, from 5,000 to 10,0001, from 5,000 to 9,000, or from 5,500 to 8,500 g/mol. Additionally or alternatively, the lower molecular weight component can have a Mz that falls within a range from 70.000 to 130.000 g/mol, such as from 70,000 to 115,000, from 75,000 to 130,000, from 75,000 to 120.000, or from 75,000 to 115,000 g/mol.

The density of the ethylene-based polymer can range from 0.944 to 0.955 g/cm$^3$. In one aspect, the density can range from 0.944 to 0.952, from 0.945 to 0.955 in another aspect, from 0.945 to 0.953 in another aspect, from 0.945 to 0.95 in another aspect, from 0.946 to 0.955 in yet another aspect, or from 0.946 to 0.952 g/cm$^3$ in still another aspect.

The ethylene polymer has a very low melt index, as indicated by the high load melt index (HLMI) in a range from 4 to 10 g/10 min. In some aspects, the HLMI of the ethylene polymer can fall within a range from 4 to 9 or from 4 to 8 g/10 min. In other aspects, the HLMI of the ethylene polymer can fall within a range from 5 to 10, from 5 to 9, or from 5 to 8 g/10 min.

In an aspect, the ethylene polymer (inclusive of the higher and lower molecular weight components) can have a Mw in a range from 230,000 to 330,000, from 230,000 to 320,000, from 240,000 to 330,000, or from 240,000 to 320,000 g/mol. The ethylene polymer has a relatively broad molecular weight distribution, often with a ratio of Mw/Mn in a range from 20 to 45. For instance, the ratio of Mw/Mn of the polymer can be from 20 to 42; alternatively, from 22 to 44; alternatively, from 25 to 45; or alternatively, from 25 to 42.

The ethylene polymer can have a CY-a parameter of from 0.45 to 0.65, from 0.47 to 0.63, from 0.47 to 0.61, from 0.48 to 0.6, from 0.5 to 0.65, from 0.5 to 0.63, or from 0.5 to 0.6, and the like. Additionally or alternatively, the ethylene polymer can have a relaxation time (Tau(eta) or $\tau(\eta)$) in a range from 1.5 to 4, from 1.5 to 3.7, from 2 to 4, or from 2 to 3.6 sec. Additionally or alternatively, the ethylene polymer can have a viscosity at 100 sec$^{-1}$ (eta @100 or $\eta$@100) at 190° C. in a range from 2000 to 3600, from 2000 to 3500, from 2100 to 3600, or from 2100 to 3500 Pa-sec. Additionally or alternatively, the ethylene polymer can have a ratio of viscosity at 0.1 sec$^{-1}$ to viscosity at 100 sec$^{-1}$ ($\eta$@0.1/$\eta$@100) in a range from 38 to 72, from 40 to 68, from 46 to 68, or from 52 to 72, and the like. These rheological parameters are determined from viscosity data measured at 190° C. and using the Carreau-Yasuda (CY) empirical model described herein.

In an aspect, the ethylene polymer described herein can be a reactor product (e.g., a single reactor product), for example, not a post-reactor blend of two polymers, for instance, having different molecular weight characteristics. As one of skill in the art would readily recognize, physical blends of two different polymer resins can be made, but this necessitates additional processing and complexity not required for a reactor product.

Moreover, the ethylene polymer can be produced with dual metallocene catalyst systems containing zirconium and/or hafnium, as discussed herein. Ziegler-Natta and chromium based catalysts systems are not required. Therefore, the ethylene polymer can contain no measurable amount of chromium or titanium or vanadium or magnesium (catalyst residue), i.e., less than 0.1 ppm by weight. In some aspects, the ethylene polymer can contain, independently, less than 0.08 ppm, less than 0.05 ppm, or less than 0.03 ppm, of chromium (or titanium, or vanadium, or magnesium).

Consistent with aspects of this disclosure, any olefin polymer (or ethylene polymer) described herein can have very few gels, characterized by a film gel count of less than 100 gels per ft$^2$ of 25 micron film. In further aspects, the film gel count can be less than 50, less than 25, less than 10, or less than 5 gels per ft$^2$ of 25 micron film. Herein, gels encompass any film defect having a size greater than 200 microns. The gel testing procedure and equipment are described in the examples that follow.

Articles and Products

Articles of manufacture can be formed from, and/or can comprise, the olefin polymers (e.g., ethylene polymers) of this invention and, accordingly, are encompassed herein. For example, articles which can comprise the polymers of this invention can include, but are not limited to, an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product (e.g., panels for walls of an outdoor shed), outdoor play equipment (e.g., kayaks, bases for basketball goals), a pipe, a sheet or tape, a toy, or a traffic barrier, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers often are added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual— Process, Materials, Properties*. TAPPI Press, 1992; the disclosures of which are incorporated herein by reference in their entirety. In some aspects of this invention, an article of manufacture can comprise any of olefin polymers (or ethylene polymers) described herein, and the article of manufacture can be or can comprise a film, such as a blown film.

Films disclosed herein, whether cast or blown, can be any thickness that is suitable for the particular end-use application, and often, the average film thickness can be in a range from 0.25 to 25 mils, or from 0.4 to 20 mils. For certain film applications, typical average thicknesses can be in a range from 0.5 to 8 mils, from 0.8 to 5 mils, from 0.7 to 2 mils, or from 0.7 to 1.5 mils.

In an aspect and unexpectedly, the films (e.g. blown films) can have excellent dart impact strength, particular in view of the density of the polymer. As an example, the ethylene polymer with a HLMI from 4 to 10 g/10 min, a density from 0.944 to 0.955 g/cm$^3$, a HMW component with a Mn from 280,000 to 440.000 g/mol, and a LMW component with a Mw from 30,000 to 45,000 g/mol and a ratio of Mz/Mw from 2.3 to 3.4, can have a dart impact greater than or equal to 150 g/mil, greater than or equal to 200 g/mil, or greater than or equal to 250 g/mil, and often can range up to 500-750 g/mil or more. For many film applications, the upper limit on dart impact is not determined, so long as the dart impact exceeds a particular minimal value or threshold. Nonetheless, the dart impact values often fall within a range from 150 to 750 g/mil, from 250 to 600 g/mil, or from 300 to 700 g/mil.

The film products encompassed herein also can be characterized by very low levels of gels, typically having a film gel count of less than 100 gels per ft$^2$ of 25 micron film, and more often, the film gel count is less than 50, less than 25, less than 10, or less than 5 gels per ft$^2$ of 25 micron film. Herein, gels encompass any film defect with a size greater than 200 microns.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Melt index (MI, g/10 min) can be determined in accordance with ASTM D1238 at 190° C. with a 2,160 gram weight, and high load melt index (HLMI, g/10 min) was determined in accordance with ASTM D1238 at 190° C. with a 21,600 gram weight. Density was determined in grams per cubic centimeter (g/cm$^3$) on a compression molded sample, cooled at 15° C. per minute, and conditioned for 40 hours at room temperature in accordance with ASTM D1505 and ASTM D4703.

Dart impact strength (g/mil) was measured in accordance with ASTM D1709 (method A, 26 inches, F50). Blown films were produced from the ethylene polymers on a high density blown film line having a 1.5-in diameter Davis-Standard extruder with a L/D of 24:1, and a 2-in diameter Sano die with a 35-mil die gap. Processing conditions included barrel temperatures of 210-230° C., a screw speed of 30 rpm, an output rate of 17-18 lb/hr, a film thickness of 1 mil, a 4.1 blow-up ratio, a line speed of 65 ft/min, a frostline height of 14 in, and a layflat width of 12.5 in.

Gels were measured on 25 μm (1 mil) film, using an automated camera-based gel counting machine made by Optical Control System (OCS), Model FS-5. The system consisted of a light source and a detector. The film was passed through the system, between the light source and the detector, with a 150-mm (6-inch) inspection width. A total of 10 square meters of film area was inspected and the gels with sizes of greater than 200 μm were analyzed, and then normalized per square foot of film.

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, MA) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 hr with occasional and gentle agitation, before the solutions were transferred to sample vials for injection. An injection volume of 200 μL was used. The integral calibration method was used to deduce molecular weights and molecular weight distributions using a Chevron Phillips Chemical Company's HDPE polyethylene resin, MARLEX® BHB5003, as the broad standard. The integral table of the broad standard was pre-determined in a separate experiment with SEC-MALS. Mn is the number-average molecular weight, Mw is the weight-average molecular weight, Mz is the z-average molecular weight, My is viscosity-average molecular weight, and Mp is the peak molecular weight (location, in molecular weight, of the highest point of the molecular weight distribution curve).

The respective LMW component and HMW component properties were determined by deconvoluting the molecular weight distribution (see e.g., FIG. 6) of each polymer. The relative amounts of the LMW and HMW components (weight percentages) in the polymer were determined using a commercial software program (Systat Software, Inc., PEAK FIT v. 4.05). The other molecular weight parameters for the LMW and HMW components (e.g., Mn, Mw, Mz, etc., of each component) were determined by using the deconvoluted data from the PEAK FIT program, and applying a PEAK FIT Chromatography/Log Normal 4-Parameter (Area) Function and two peaks without any constraints in deconvolution, per below (where $a_0$=area; $a_1$=center; $a_2$=width (>0); and $a_3$=shape (>0, ≠1)):

$$y = \frac{a_0\sqrt{\ln(2)}(a_3^2-)}{a_2 a_3 \ln(a_3)\sqrt{\pi}\exp\left[\frac{\ln(a_3^2)}{4\ln(2)}\right]} \exp\left[-\frac{\left(\ln(2)\ln\left(\frac{(x-a_1)(a_3^2-1)}{a_2 a_3}+1\right)\right)^2}{\ln(a_3)^2}\right]$$

Melt rheological characterizations were performed as follows. Small-strain (less than 10%) oscillatory shear measurements were performed on an Anton Paar MCR rheometer using parallel-plate geometry. All rheological tests were performed at 190° C. The complex viscosity |η*| versus frequency (ω) data were then curve fitted using the modified three parameter Carreau-Yasuda (CY) empirical model to obtain the zero shear viscosity—$\eta_0$, characteristic viscous relaxation time—$\tau_\eta$, and the breadth parameter—α (CY-a parameter). The simplified Carreau-Yasuda (CY) empirical model is as follows.

$$|\eta^*(\omega)| = \frac{\eta_0}{[1+(\tau_\eta\omega)^a]^{(1-n)/a}},$$

wherein: |η*(ω)|=magnitude of complex shear viscosity;
$\eta_0$=zero shear viscosity;
$\tau_n$=viscous relaxation time (Tau(η));
α="breadth" parameter (CY-a parameter);
η=fixes the final power law slope, fixed at 2/11; and
ω=angular frequency of oscillatory shearing deformation.

Details of the significance and interpretation of the CY model and derived parameters can be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids. Volume 1, Fluid Mechanics*, 2nd Edition. John Wiley & Sons (1987); each of which is incorporated herein by reference in its entirety. The tan δ at 0.1 sec$^{-1}$, tan δ at 100 sec$^{-1}$, viscosity at 0.1 sec$^{-1}$, and viscosity at 100 sec$^{-1}$ properties were determined using the Carreau-Yasuda (CY) empirical model.

The long chain branches (LCBs) per 1000 total carbon atoms of the overall polymer can be calculated using the method of Janzen and Colby (*J. Mol. Struct.*, 485/486, 569-584 (1999), incorporated herein by reference in its entirety), from values of zero shear viscosity, $\eta_o$ (determined from the Carreau-Yasuda model, described hereinabove), and measured values of Mw obtained using a Dawn EOS multiangle light scattering detector (Wyatt).

Metals content, such as the amount of catalyst residue in the ethylene polymer or film/article, can be determined by ICP analysis on a PerkinElmer Optima 8300 instrument. Polymer samples can be ashed in a Thermolyne furnace with sulfuric acid overnight, followed by acid digestion in a HotBlock with HCl and $HNO_3$ (3:1 v:v).

Solid activator particle size distributions were determined by using an aqueous suspension of the activator and a Microtrac S3500 laser particle size analyzer. Conditions were set to "opaque" with a run time of 30 sec, number of measurements 3, and shape spherical. As a skilled artisan would readily recognize, supporting the metallocene compound(s) on the solid activator would not impact the particle size distribution, thus the particle size distribution of the supported metallocene catalyst would be effectively the same as the particle size distribution of the solid activator. Polymer particle size distributions were obtained on a dry basis with a Beckman-Coulter, model Fraunhofer RF780F LS 13 320 laser-based particle size analyzer. Conditions were set to 0.7% residual, 9.9 inches of water of vacuum, 2% of obscuration, number of passes 3, and a 23 sec run time.

Example A

Particle Size Distributions of Solid Activators

Solid activators were prepared as follows. A silica-coated alumina having a surface area of 450 m$^2$/g, a pore volume of 1.3 mL/g, and 38 wt. % silica was treated in three ways. In the first method, 1 part of the silica-coated alumina by weight was slurried in 5.7 parts by weight of water. Then, 0.055 parts by weight of hydrofluoric acid were added, and the slurry was stirred for several hours. During this time, fluorine was gradually adsorbed, and when this was complete, the fluorided silica-coated alumina was spray dried, producing a solid activator with an average particle size of 48 μm. This material was then given a further treatment using an air-mill, also called a jet-mil, which broke down the largest particles into many smaller ones. This produced the Comparative 1 solid activator, with a d50 average particle size (diameter) of 9.4 μm.

In the second method, the same procedure was used, however, rather than being subjected to jet-milling, the solid activator was instead passed through a 270 mesh sieve. That which remained on the screen was recycled, whereas that which passed through the screen was captured for use later, producing the Inventive 2 solid activator, with a d50 average particle size of 31.6 μm.

In the third method, one part by weight of the same silica-coated alumina was slurried in 4.8 parts by weight of water, then 0.058 parts of tetrafluoroboric acid and 0.048 parts of zinc oxide powder were added. After slurrying for several hours and spray drying, this material was further refined using air classification to remove the largest particles. Then, in a second but similar step, this solid activator was further air-classified to remove the smallest particles, resulting in the Inventive 1 solid activator, having a d50 average particle size of 19.3 μm.

In a fourth method, an alumina having a surface area of 300 m$^2$/g and a pore volume of 1.3 mL/g was calcined at 600° C. Then, one part by weight of this material was slurried in 5.2 parts by weight of water, following by adding 0.15 parts of sulfuric acid. After slurrying for another 30 min and spray drying, this procedure produced the Comparative 2 solid activator, having a d50 average particle size of 86.5 μm.

FIG. 1 illustrates the particle size distributions of these four solid activators (amount of particles by weight versus the particle diameter plotted on a log-scale). Table I summarizes various parameters calculated from the particle size distributions of the four solid activators: Inventive 1, Inventive 2, Comparative 1, and Comparative 2. The Inventive 1 solid activator had the narrowest particle size distribution and a d50 average particle diameter larger than that of Comparative 1 and smaller than that of Inventive 2 and Comparative 2.

The d50 average particle size of the Inventive 1 solid activator was 19.3 μm and the particle size span ((d90-d10)/d50) was less than 1 (0.85). The Inventive 1 solid activator also had a d10 particle size greater than 10 μm (12.7 μm), a d95 particle size less than 40 μm (~34 μm), and a ratio of d90/d10 less than 3 (2.3). Further, less than 2% of the Inventive 1 solid activator had a particle size of less than 10 μm, less than 1% had a particle size of greater than 45 μm, and at least 99% had a particle size of less than 50 μm.

The d50 average particle size of the Inventive 2 solid activator was 31.6 μm and the particle size span ((d90-d10)/d50) was less than 1.5 (1.23). The Inventive 2 solid activator also had a d10 particle size greater than 10 μm (11.2 μm), a d95 particle size less than 60 μm (~57 μm), and a ratio of d90/d10 less than 5 (4.5). Further, less than 5% of the Inventive 2 solid activator had a particle size of less than 10 μm, less than 20% had a particle size of greater than 45 μm, and at least 88% had a particle size of less than 50 μm.

Example B

Particle Size Distributions of the Resultant Polymer Powders

The four solid activators of Example A were then calcined at 600° C. in dry air for eight hours, and afterward stored under nitrogen until use. Each was tested in a commercial-scale loop reactor, using two metallocenes simultaneously to produce a nominal 7-9 HLMI ethylene/1-hexene copolymer with a nominal 0.948-0.950 density. The two metallocenes used are shown below. During these experiments, the ethylene concentration was 4-6 wt. %, the reactor temperature was 205° F., and the residence time was 50-75 min. The feed rate of hydrogen and each metallocene were varied to achieve the target HLMI and density and this was accomplished with a weight-to-weight feed ratio of MET 2 to MET 1 of 2.1-3.5 and a hydrogen feed rate of 0.15-0.3 lb H$_2$/1000 lb ethylene. Reactant concentrations in the precontactor were 30,000-50,000 ppm solid activator and 5000-6000 ppm triisobutylaluminum, the total metallocene to solid activator weight ratio was 0.6-0.7%, the triisobutylaluminum to solid activator weight ratio was 0.12 to 0.19, and the residence time was 30 min.

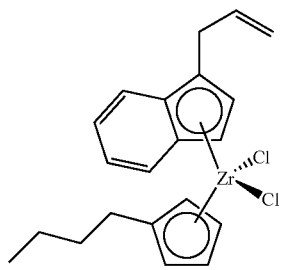

MET 1

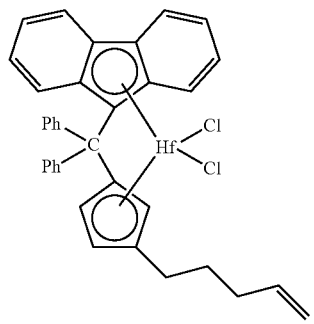

MET 2

Figure 2:
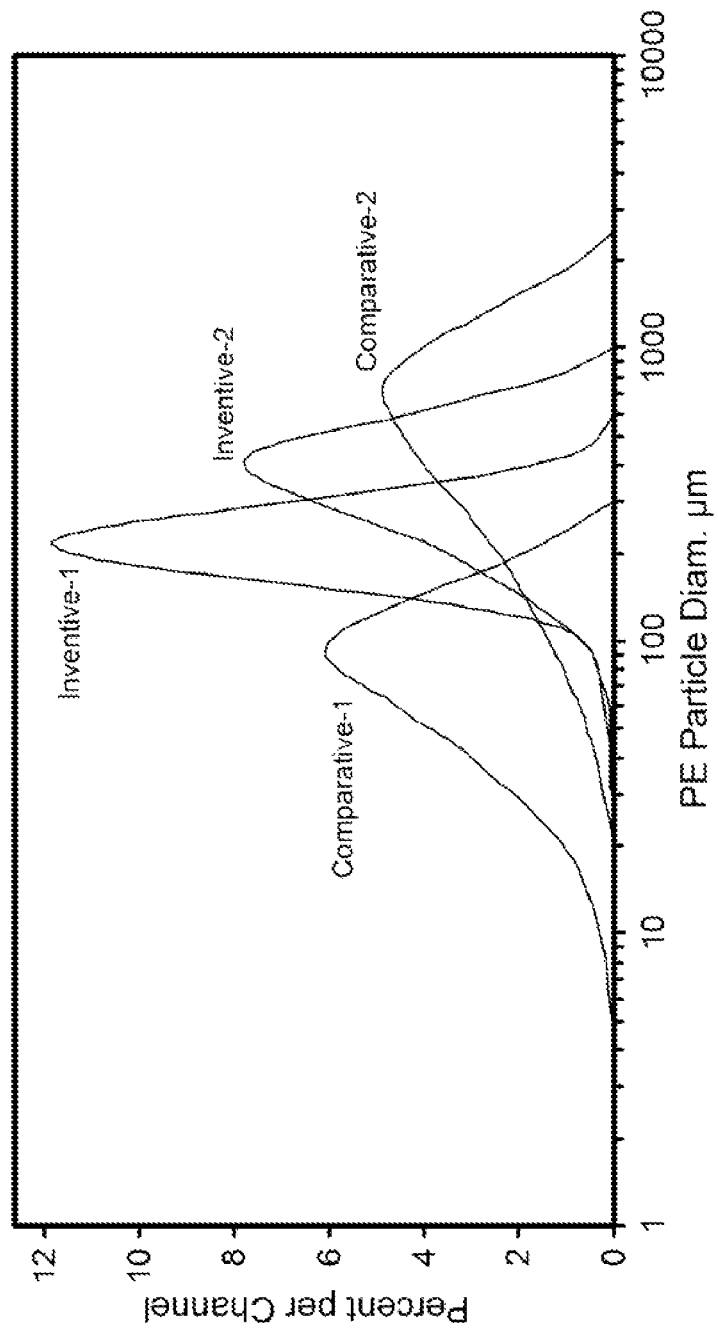
FIG. 2 presents a plot of the particle size distributions of the Inventive 1, Inventive 2, Comparative 1, and Comparative 2 polymer powders.

Particle size distributions of the polymers were obtained and are shown in FIG. 2, while Table II list various parameters determined from the distributions in FIG. 2. In Table II, the d50 average particle size of the Inventive 1 polymer powder was 235 μm and the particle size span ((d90-d10)/d50) was less than 1.5 (1.3). The Inventive 1 polymer powder also had a d90 particle size less than 500 μm (462 μm) and a ratio of d90/d10 less than 4 (3.1). Further, less than 3% (2.2%) of the Inventive 1 polymer powder had a particle size of less than 100 μm and less than 1% had a particle size of greater than 1000 μm.

The d50 average particle size of the Inventive 2 polymer powder was 388 μm and the particle size span ((d90-d10)/d50) was less than 1.5 (1.37). The Inventive 2 polymer powder also had a d90 particle size less than 700 μm (694 μm) and a ratio of d90/d10 less than 5 (4.2). Further, less than 5% (3.4%) of the Inventive 2 polymer powder had a particle size of less than 100 μm and less than 1% had a particle size of greater than 1000 μm.

In slurry polymerization, one catalyst particle tends to make one much-larger polymer particle, unless it is broken by extreme mechanical forces. Thus, the shape of the polymer particles, and also the polymer particle size distribution, tend to replicate that of the catalyst particle. Thus, due to the small average particle diameter of the Comparative 1 solid activator, and the large percentage of particles less than 10 μm (fines), Comparative 1 resulted in severe transfer problems during operations with both activator/catalyst and the resultant polymer. In fact, the problem was so severe that the test had to be stopped due to unmanageable plugging of a downstream polymer feed hopper. Consequently, the Comparative 1 solid activator was deemed completely unsuitable for commercial loop slurry polymerization.

The Inventive 2 solid activator was found to be acceptable during calcination operations, because it caused no transfer difficulties during charging and discharging operations of the calciner. Neither did it cause difficulties during the charging operation to the reactor feed tank. However, the polymer made still exhibited some minor difficulties with transfer of the polymer powder in downstream drying and transfer operations. Several plugs were obtained during the test, however, the transfer problems were manageable and the test run continued successfully to the end.

In contrast, the Inventive 1 solid activator/catalyst performed exceptionally well during the loop slurry polymerization experiments, transferring easily and cleanly during calcination and then to the reactor. The charging and discharging operations offered very little resistance from packing or static. Likewise, Inventive 1 made polymer powder that was also exceptional in its transfer properties during the test. It discharged from the reactor easily, with no plugs or fines or dust, and it performed well during downstream purging/drying operations. Transfer to the storage and later to the pelletizing silos went extremely well, indicating that the smaller particle size offers less resistance and has less tendency to "drop out" and pack.

The Comparative 2 solid activator/catalyst had a moderately narrow size distribution, but with much larger diameters than the other examples. This catalyst produced large polymer particles, which are more prone to breakage, which can be seen in FIG. 2 by the increased breadth of the polymer particle size distribution, compared to that of the activator/catalyst particle size distribution (FIG. 1). Note that the polymer has more small particles than would be expected from the large narrow catalyst particle size distribution. Thus, despite the larger overall size, Comparative 2 produced more polymer fines than either of the smaller Inventive examples.

The higher amount of polymer fines produced by Comparative 2 due to breakage also resulted in transfer difficulties downstream, despite the overall larger average size. The larger particles also caused problems in the reactor itself, because they have more difficulty circulating around the loop. This is because large particles tend to have higher terminal velocity, and thus they have a greater tendency to "drop out" or fall. Because the circulation pump must work against this tendency, it usually requires higher amperage to circulate the larger particles and the pump reaches its limit more quickly. This tends to limit the concentration of polymer in the slurry, and thus ultimately, the final production rate.

In contrast, the Inventive 1 solid activator/catalyst performed exceptionally in the loop reactor. Because the PE particles made were smaller, their terminal velocity in isobutane was lower, compared to Inventive 2 and especially the larger particles of Comparative 2. This resulted in the pump amperage dropping significantly in comparison. The drop in required pump power allows more concentrated slurries to be used, which increases production rate. The catalyst from Inventive 1 also produced little to no polymer fines, such as particles smaller that 100 µm, or smaller than 75 µm, or smaller than 50 µm. This is because it is usually the larger particles breaking up that produce fines, and the inventive catalysts had few or no larger particles. This also helps production rates, because fines can cause localized over-heating ("hot-spots") or fouling or plate-out as they stick to walls and thermocouples by static and continue to polymerize ethylene to build up "wall scale" that inhibits flow and heat transfer. Thus, Inventive 1 represented the best reactor performance, with respect to particle size distribution of both the activator/catalyst and the resultant polymer.

Another important polymer attribute for loop slurry polymerization is the concept of "gels." The term is used to indicate visual and surface imperfections in the final polymer article, most especially film products. Such imperfections or "gels" in the film not only detract from the appearance of the article (such as a bag), but the resulting bumps on the surface also can cause printing defects. Gels can have many sources, including contamination from dirt or other foreign material, additive particles that are insufficiently blended into the molten polymer during pelletizing extrusion, unreacted catalyst particles, or other polymer particles left from previous production of other polymer grades of higher molecular weight or from other sources that were not successfully blended into the bulk polymer during pelletizing extrusion.

Figure 3:
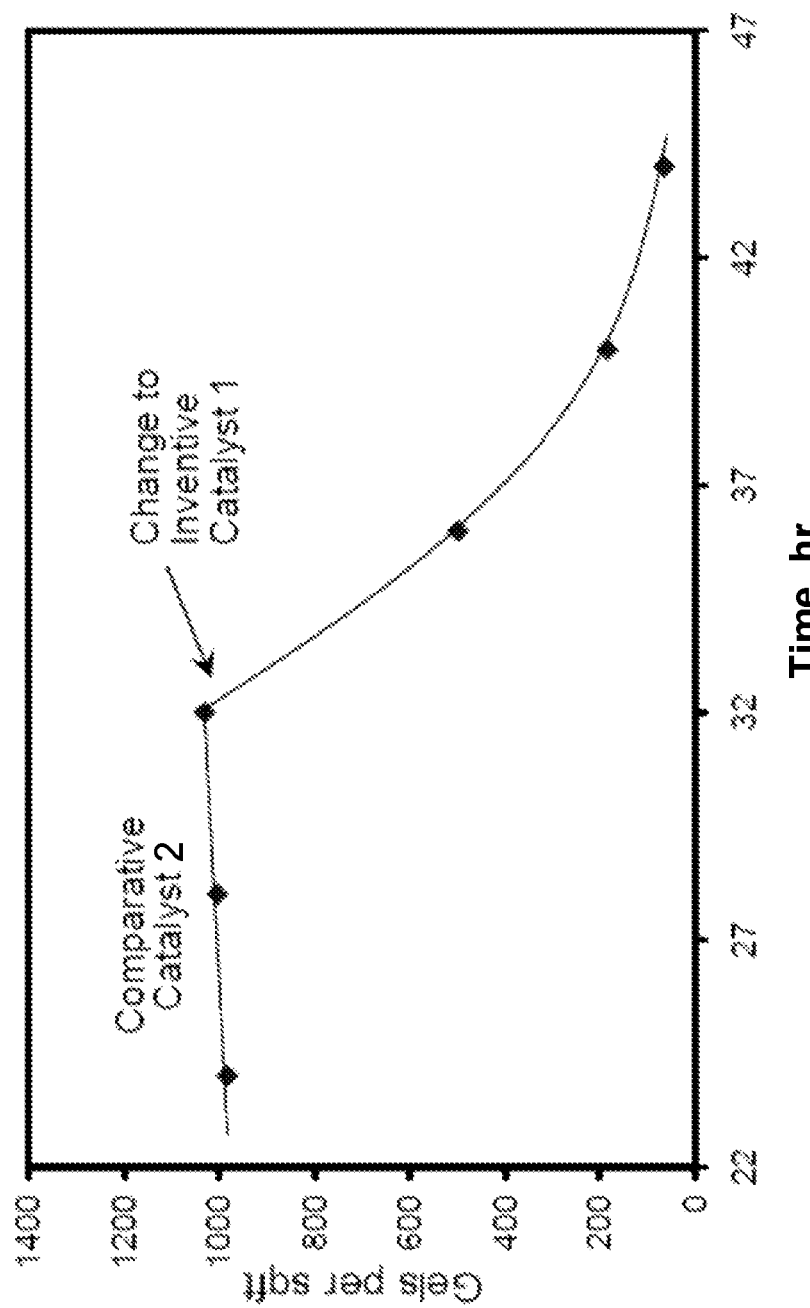
FIG. 3 presents a plot of film gel count versus time as the Comparative 2 catalyst is transitioned to the Inventive 1 catalyst.

Large catalyst particles, and the resulting large polymer particles, also tend to make larger, more noticeable gels, resulting in an inferior final product. The influence of catalyst/polymer particle size on gel count is illustrated in FIG. 3. The graph represents a transition from one solid activator/catalyst to another solid activator/catalyst. A solid activator similar to Comparative 2 was used to produce the polymer. The gel content was being measured about every three hours as the polymer was made. Due to the long residence time of the overall system, it took almost a day to fully replace one catalyst with the other. On this occasion, the gel count was initially near 1000 gels (>200 µm) per square foot of film. At a time of about 32 hr, the feeding of Comparative 2 was stopped and the feeding of Inventive 1 was begun, although no other changes were made to the reactor. Immediately, the gel count started dropping as the first activator/catalyst, and its larger polymer particles, were gradually replaced by the Inventive 1 activator/catalyst and the smaller polymer particles it makes. This changed caused the gel count to drop by almost two orders of magnitude, to less than 50 gels/ft$^2$ and decreasing before the experiment was completed.

Figure 4:
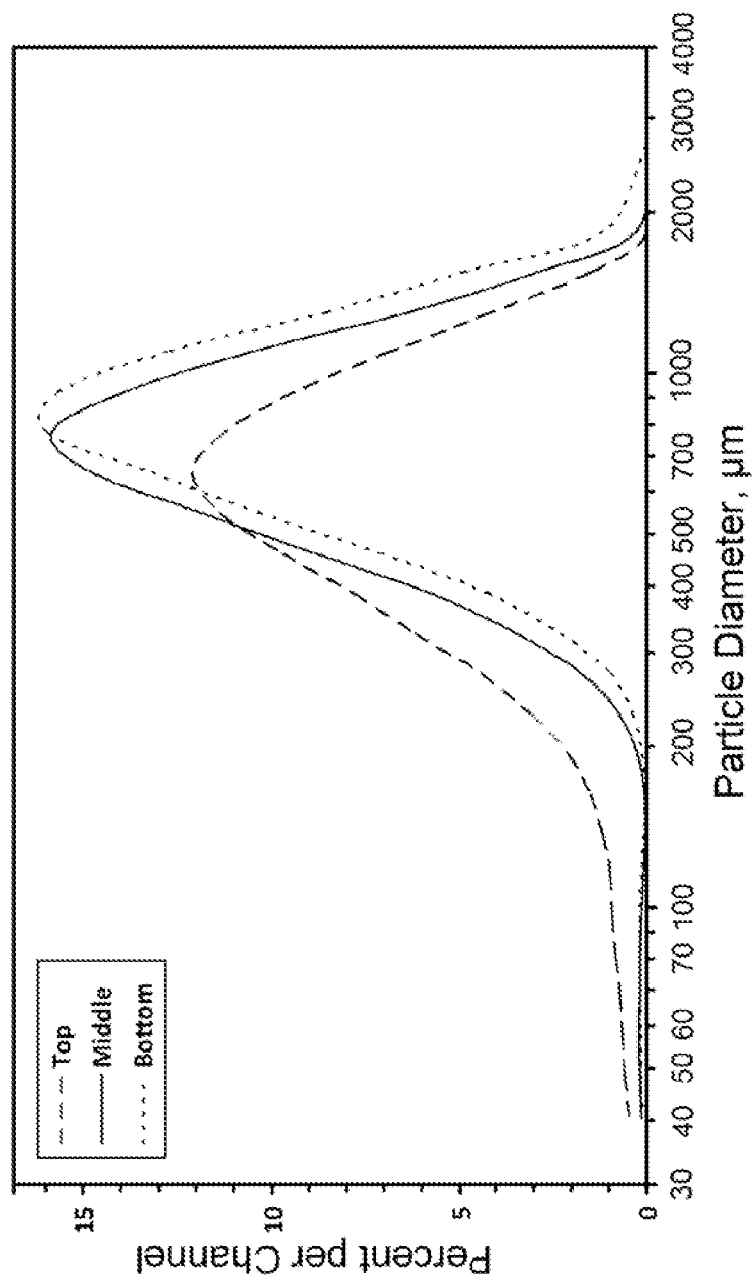
FIG. 4 presents a plot of segregation test results for the Comparative 2 polymer powder.

Another problem that can result from the production of a broad size distribution of polymer particles is segregation between the sizes during handling. This is especially a problem when the polymer particles of different sizes also have different molecular weights and different densities. This can happen from many causes, such as development of feedstock diffusion gradients through the individual particles during production, non-uniform adsorption of various catalyst components including the aluminum alkyl, selective breakage, etc. FIG. 4 shows an example of this effect. Three polymers were fluidized by nitrogen for a short time in a special test designed to measure the tendency of powders to segregate (ASTM 6941). When the fluidization was stopped, the still polymer bed was then sampled from the top, bottom, and middle positions. FIG. 4 shows the particle size distributions of one of these polymers, made with the Comparative 2 solid activator, in comparison to the original unfluidized composite sample. The Comparative 2 polymer had a strong tendency to segregate, with small particles preferring to rise to the top of the bed and large particles preferring to sink to the bottom. This not only contributes to flow problems and feeder "surging," but the smaller particles were also found to have significantly lower molecular weight than the larger particles, so that the polymer molecular weight exiting the pelletizing extruder can vary over time due to particle settling upstream, causing the pellet HLMI to vary even within the same lot of polymer powder.

In contrast, the Inventive 1 polymer powder exhibited little or no tendency to segregate. The results of these segregation tests are summarized in Table III, where the Inventive 1 polymer is compared to two different polymers made with the Comparative 2 activator/catalyst. The difference between top and bottom of the bed indicates the degree of separation. The percent change is the difference in size between top and bottom divided by that of the composite. The coefficient of variation is the standard deviation of the three numbers (top, bottom, composite) divided by the average of the three numbers. Surprisingly, all of the coefficient of variation values at d10, d50, and d90 are significantly lower for the Inventive 1 polymer compared to that of Comparative 2.

When a comonomer, such as 1-hexene, is introduced into the reactor, it incorporates into the polymer, making the polymer less crystalline, and therefore with a lower density. Larger particles tend to incorporate a different amount of comonomer from that incorporated by the smaller particles, resulting in different densities. This is particularly problematic in dual metallocene catalyst systems. The phenomenon can be caused by feedstock diffusion gradients generated through the particles, or by non-uniform composition of catalyst particles, or even through reactor gradients such as the "hot-spots" described above. The degree of heterogeneity in the polymer powder can thus be quantified by a flotation test. That is, polymer powder was slurried in isopropanol, which has a lower density than any polymer particle. Therefore, all of the particles sink in the alcohol. However, small increments of water were then added to the slurry to raise the liquid density in small increments. As water was slowly added, particles having the lowest density begin to float and they were skimmed off the top, and dried. More water was then added and more polymer particles rise to the top and the process is repeated. Eventually, the density of the liquid was increased enough so that all of the polymer particles, even those with the least comonomer incorporated, rise to the top and were skimmed off. In this way, the entire polymer powder was fractionated by particle density and the amount of comonomer each particle incorporated.

Figure 5:
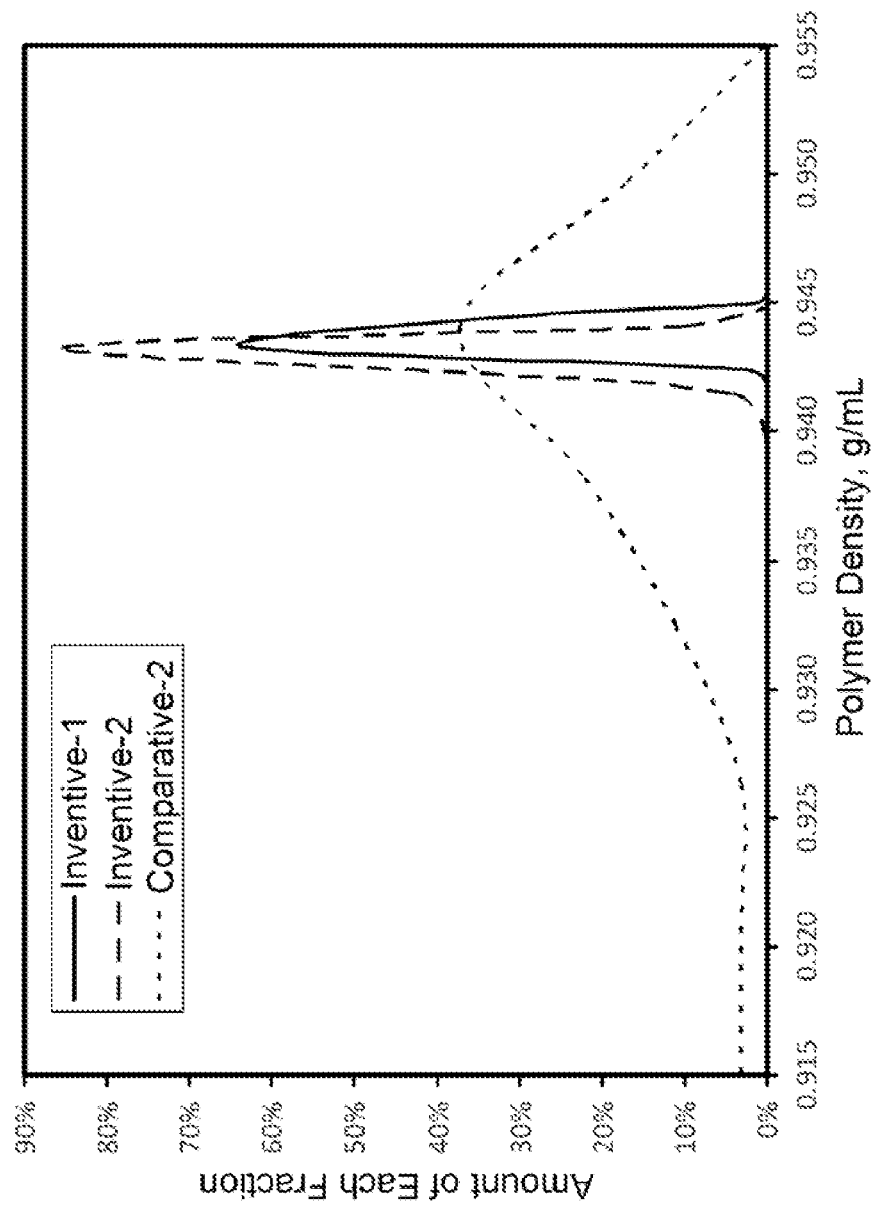
FIG. 5 presents a plot of the flotation density distribution of the Inventive 1, Inventive 2, and Comparative 2 polymer powders.

An example of the flotation test is shown in FIG. 5. The amount of floating polymer is plotted against the density of the liquid for each increment of water added for the Inventive 1 polymer powder, the Inventive 2 polymer powder, and Comparative 2 polymer powder. The two inventive polymers had a much narrower spread in the density of the polymer particles made, indicating significantly better homogeneity within the powder. The density of the polymer particles in Comparative 2 varied from 0.955 to 0.915, for a density spread of 0.04 g/cm³. In contrast, the density spreads for the two inventive polymers were only 0.003-0.005 g/cm³.

Examples 1-40

Polymer Properties

Pilot scale polymerizations were conducted using a 30-gallon slurry loop reactor at a production rate of 30-33 pounds of polymer per hour. Polymerizations were carried out under continuous particle form process conditions in a loop reactor (also referred to as a slurry process) by contacting a dual metallocene solution in toluene and isobutane and possibly 1-hexene, an organoaluminum solution (tri-isobutylaluminum, TIBA), and a solid activator in a 1-L stirred autoclave with continuous output to the loop reactor. The TIBA and dual metallocene solutions were fed as separate streams into the isobutane flush going into the autoclave. The solid activator was also continuously flushed into the autoclave with isobutane and the TIBA/metallocene mixture flowing together to the autoclave. The isobutane flush used to transport the solid activator into the autoclave was set at a rate that would result in a residence time of 30 minutes in the autoclave. The total flow from the autoclave then entered the loop reactor.

The ethylene used was polymerization grade ethylene obtained from AirGas or Praxair which was then further purified through a column of alumina-zeolite adsorbent (dehydrated at 230-290° C. in nitrogen). Polymerization grade 1-hexene (obtained from Chevron Phillips Chemical Company) was used and was further purified by distillation and passed through a column of alumina-zeolite absorbent dehydrated at 230-290° C. in nitrogen. The loop reactor was liquid full, 15.2 cm in diameter, and had a volume of 30 gallons (113.6 liters). Liquid isobutane was used as the diluent. Hydrogen was added to tune the molecular weight and/or HLMI of the polymer product. The isobutane used was polymerization grade isobutane (obtained from Enterprise) that was further purified by distillation and subsequently being passed through a column of alumina (dehydrated at 230-290° C. in nitrogen). Co-catalyst TIBA was added in a concentration in 30 to 90 ppm based on the weight of the diluent in the polymerization reactor.

Reactor conditions included a reactor pressure of 600 psig, a mol % ethylene of 4-7 wt % (based on isobutane diluent), a 1-hexene content of 0.4-0.8 mol % (based on isobutane diluent), 0.5-0.8 lb of hydrogen per 1000 lb of ethylene, and a polymerization temperature of 88-98° C. The reactor was operated to have a residence time of 75 min. Total metallocene concentrations in the reactor were within a range of 1 to 3 parts per million (ppm) by weight of the diluent. The solid activator was fed to the reactor at the rate of 4-9 g per hour.

Polymer was removed from the reactor at the rate of 30-33 lb/hr and passed through a flash chamber and a purge column. Nitrogen was fed to the purge column to ensure the powder/fluff was hydrocarbon free. The structures for metallocenes MET 1 and MET 2 that were used in the catalyst system are shown below (the weight ratio of MET 1:MET 2 was in the 0.3:1 to 1.5:1 range to produce the desired polymer composition):

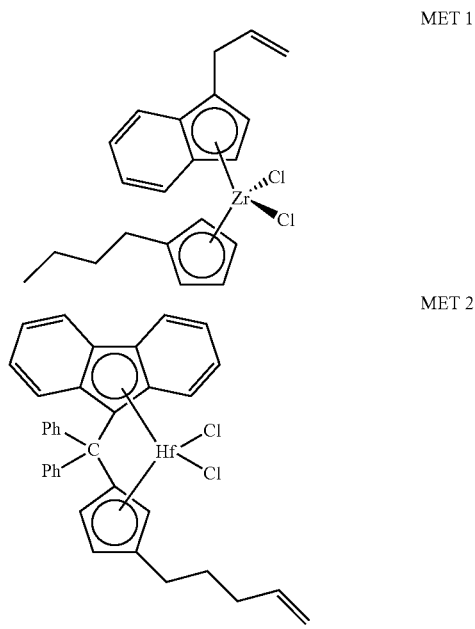

The particle size distributions of the polymer powder/fluff produced using this dual catalyst system containing the solid activators Inventive 1, Inventive 2, Comparative 1, and Comparative 2 are summarized in FIG. 2 and Table II. Polymer particle size distributions from the pilot plant experiments were very similar to those described above. The polymer powder made using the Inventive 1 solid activator had the narrowest particle size distribution, followed by Inventive 2, Comparative 1, and finally Comparative 2.

The following data tables contain polymers from both the commercial reactor (Example 1-15) and the pilot plant (Examples 16-40), all made using solid activators Inventive 1, Inventive 2, or Comparative 2. The Comparative 1 solid activator performed so poorly in the loop reactor that no useable polymer could be collected to analyze. In each example below, the resulting polymer powder was mixed and pelletized using a conventional pelletizing extruder to form resin pellets. Then, for some examples, 1-mil blown films were produced for dart impact testing.

Figure 6:
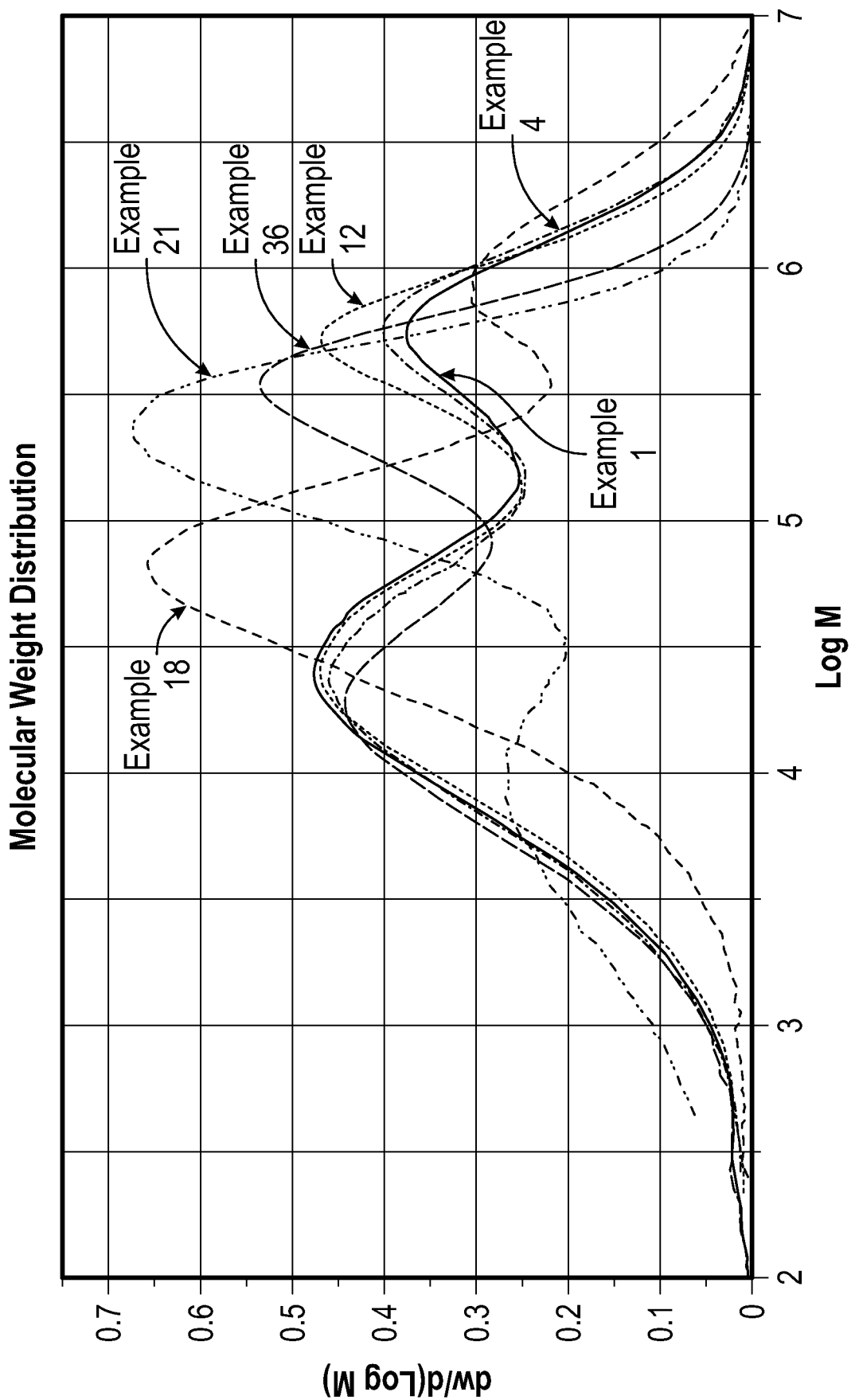
FIG. 6 presents a plot of the molecular weight distributions of the polymers of Examples 1, 4, 12, 18, 21, and 36.

Table IV lists the solid activator used to make each polymer, as well as the resultant density, HLMI, and puncture resistance (dart impact strength) of 1-mil film blown for each polymer. FIG. 6 illustrates the bimodal molecular weight distributions (amount of polymer versus the logarithm of molecular weight) of the polymers of Examples 1, 4, 12, 18, 21, and 36. The polymers of Examples 1-15 had densities ranging from 0.947 to 0.95 g/cm$^3$, HLMI values ranging from 5 to 8 g/10 min, and dart impact values averaging 390 g/mil, unexpectedly higher than the average dart impact of 320 g/mil for Examples 16-40. While not wishing to be bound by theory, it is believed that the improved homogeneity of comonomer incorporation and polymer powder/fluff density (e.g., FIG. 5) results in the improvement in dart impact strength, even though the overall bulk polymer densities are unchanged.

Table V summarizes certain molecular weight characteristics of the polymers of Examples 1-40. The Mw values ranged from 250,000 to 320,000 g/mol and the ratios of Mw/Mn ranged from 21 to 42 for the polymers of Example 1-15, whereas the Mw values were below 250,000 g/mol and the Mw/Mn values were below 20 for many of Examples 16-40.

The bimodal molecular weight distributions from each of these polymers were then deconvoluted into their respective high-MW and low-MW components (LMW and HMW) as described herein. The molecular weight parameters for the LMW and HMW components (e.g., Mn, Mw, and Mz of each component) of each example were determined by using the deconvoluted data from the PEAK FIT program, and are listed in Tables VI and VII. As shown in these tables, the ethylene polymers of Examples 1-contained 60-67 wt. % of the LMW component, which had a Mw of 32,000-40,000 g/mol and a ratio of Mz/Mw from 2.3 to 3. The HMW component had a Mn ranging from 290,000 to 400,000 g/mol. The combined polymer properties of Examples 1-15 are not found in any of Examples 16-40.

Table VIII summarizes certain rheological characteristics at 190° C. for the polymers of Examples 1-40. These were determined using the Carreau-Yasuda model as described above. The polymers of Examples 1-15 had CY-a parameters of 0.49-0.62, relaxation times ($\tau(\eta)$) from 1.5 to 4 sec, viscosities at 100 sec$^{-1}$ ($\eta$@d; 100) from 2100 to 3500 Pa-sec, and ratios of the viscosity at 0.1 sec$^{-1}$ to the viscosity at 100 sec$^{-1}$ ($\eta$@0.1/$\eta$@100) ranging from 41 to 68.

In summary, these polymer properties demonstrate the unexpected relationship between the particle size distribution of the solid activators (or the supported metallocene catalysts) and the polymer rheology and molecular weight distribution, particularly as it pertains to the LMW and the HMW components.

TABLE I

Particle size distributions of solid activators.

| Example | Inventive 1 | Inventive 2 | Comparative 1 | Comparative 2 |
|---|---|---|---|---|
| Mv, μm | 20.22 | 30.4 | 11.53 | 92.63 |
| Mn, μm | 5.63 | 6.29 | 3.01 | 40.43 |
| Mv/Mn | 3.59 | 4.83 | 3.83 | 2.29 |
| Mp, μm | 20.17 | 33.0 | 13.08 | 88.00 |
| Std Dev, μm | 5.97 | 14.41 | 7.23 | 35.07 |
| Mp-Mv, μm | 0.2% | 7.9% | 1.55 | 5.3% |
| Mv/Mp | 1.00 | 0.92 | 0.88 | 1.05 |
| Ma, μm | 16.37 | 21.82 | 6.90 | 74.74 |
| Mp/Ma | 1.23 | 1.51 | 1.90 | 1.18 |
| Mp/Ma, μm | 3.80 | 11.18 | 6.18 | 13.26 |
| Full Breadth, μm | 49.93 | 112.2 | 86.84 | 368.34 |
| 1/2 ht Breadth, μm | 12.76 | 39.14 | 21.56 | 73.47 |
| Weight Percentile, μm | | | | |
| 10% | 12.74 | 11.23 | 3.39 | 47.47 |
| 20% | 15.06 | 19.45 | 4.60 | 61.77 |
| 30% | 16.59 | 24.58 | 5.91 | 70.46 |
| 40% | 17.95 | 28.30 | 7.49 | 78.53 |
| 50% | 19.31 | 31.58 | 9.36 | 86.48 |
| 60% | 20.79 | 34.81 | 11.47 | 95.1 |
| 70% | 22.55 | 38.41 | 13.88 | 105.3 |
| 80% | 24.94 | 42.94 | 16.95 | 119.1 |
| 90% | 29.15 | 50.19 | 22.09 | 142.9 |
| 95% | 33.77 | 57.64 | 27.81 | 168.7 |
| 90/10 | 2.29 | 4.47 | 6.52 | 3.01 |
| 90-10, μm | 16.41 | 38.96 | 18.70 | 95.43 |
| 80/20 | 1.66 | 2.21 | 3.68 | 1.93 |
| 80-20, μm | 9.88 | 23.49 | 12.35 | 57.33 |
| 95-10, μm | 21.03 | 46.41 | 24.42 | 121.23 |
| 95-50, μm | 14.46 | 26.06 | 18.45 | 82.22 |
| 50-10, μm | 6.57 | 20.35 | 5.97 | 39.01 |
| Span, (D90-D10)/D50 | 0.85 | 1.23 | 2.00 | 1.10 |
| Less than 10 μm, % | 1.3 | 4.9 | 49.4 | 0.0 |
| At least 45 μm, % | 0.9 | 16.4 | 1.0 | 91.7 |
| Less than 50 μm, % | 99.1 | 88.8 | 99.0 | 10.3 |

TABLE II

Particle size distributions of PE powder made using four solid activators.

| Solid Activator | Inventive 1 | Inventive 2 | Comparative 1 | Comparative 2 |
|---|---|---|---|---|
| Mv, μm | 277.0 | 410.9 | 94.2 | 895.6 |
| Median, μm | 235.4 | 387.7 | 79.2 | 803.6 |
| Mean/Median | 1.18 | 1.06 | 1.19 | 1.11 |
| Mode, μm | 223.4 | 471.1 | 37.5 | 1091 |
| Std. Dev., μm | 156.4 | 205.3 | 82.8 | 524.1 |
| Coeff. Of Variation | 56% | 50% | 88% | 62% |
| Full width, μm | 430.2 | 998.0 | 326.0 | 2480.0 |
| Weight Percentile, μm | | | | |
| 10% | 150.9 | 163.5 | 27.1 | 138.7 |
| 25% | 186.7 | 255.9 | 45.2 | 436.1 |

TABLE II-continued

Particle size distributions of PE powder made using four solid activators.

| Solid Activator | Inventive 1 | Inventive 2 | Comparative 1 | Comparative 2 |
|---|---|---|---|---|
| 50% | 235.4 | 387.7 | 78.0 | 803.6 |
| 75% | 306.3 | 539.9 | 118.2 | 1231 |
| 90% | 462.0 | 694.4 | 162.2 | 1622 |
| Weight Percentile, % | | | | |
| <1 μm | 0.0% | 0.0% | 0.0% | 0% |
| <5 μm | 0.0% | 0.0% | 0.2% | 0.0% |
| <10 μm | 0.1% | 0.1% | 1.0% | 0.2% |
| <50 μm | 0.7% | 1.1% | 28.8% | 3.2% |
| <100 μm | 2.2% | 3.4% | 65.0% | 7.3% |
| <200 μm | 31.8% | 15.5% | 95.6% | 13.7% |
| <1000 μm | 99.6% | 99.3% | 100.0% | 62.8% |
| Weight % on sieve # | | | | |
| 1000 | 1.1% | 2.6% | 47.8% | 5.3% |
| 200 | 12.2% | 7.6% | 39.1% | 5.4% |
| 100 | 46.2% | 17.3% | 11.2% | 5.4% |
| 60 | 28.0% | 35.9% | 0.8% | 8.3% |
| 40 | 11.1% | 35.1% | 1.1% | 28.8% |
| 20 | 1.3% | 1.7% | 0.0% | 39.1% |
| 12 | 0.0% | 0.0% | 0.0% | 7.7% |
| thru 100 mesh | 13.3% | 10.1% | 86.9% | 10.7% |
| thru 200 mesh | 1.1% | 2.6% | 47.8% | 5.3% |
| Span, (D90-D10)/D50 | 1.32 | 1.37 | 1.73 | 1.85 |

TABLE III

Polymer powder segregation test results.

| Catalyst | Sample | d 10, μm | d50, μm | d90, μm | Mean, μm |
|---|---|---|---|---|---|
| Comparative 2 | Top | 241 | 737 | 1409 | 787 |
| Comparative 2 | Middle | 340 | 807 | 1522 | 868 |
| Comparative 2 | Bottom | 439 | 880 | 1490 | 921 |
| Comparative 2 | Composite | 353 | 830 | 1549 | 889 |
| Comparative 2 | Change | 56.2% | 17.1% | 5.3% | 15.1% |
| Comparative 2 | Coeff of Var. | 29.1% | 8.8% | 4.0% | 7.9% |
| Comparative 2 | Top | 176 | 554 | 1056 | 590 |
| Comparative 2 | Middle | 367 | 704 | 1178 | 738 |
| Comparative 2 | Bottom | 415 | 782 | 1290 | 816 |
| Comparative 2 | Composite | 339 | 716 | 1230 | 748 |
| Comparative 2 | Change | 70.6% | 31.7% | 19.0% | 30.1% |
| Comparative 2 | Coeff of Var. | 39.6% | 17.0% | 10.0% | 16.0% |
| Inventive 1 | Top | 143 | 228 | 453 | 228 |
| Inventive 1 | Middle | 154 | 238 | 457 | 238 |
| Inventive 1 | Bottom | 158 | 237 | 467 | 237 |
| Inventive 1 | Composite | 151 | 235 | 462 | 235 |
| Inventive 1 | Change | 10.0% | 3.5% | 3.0% | 3.5% |
| Inventive 1 | Coeff of Var. | 5.1% | 2.2% | 1.5% | 2.2% |

TABLE IV

Summary of polymer examples produced using solid activators.

| Example | Solid Activator | Density (g/cc) | HLMI (g/10 min) | Dart Impact (g/mil) |
|---|---|---|---|---|
| 1 | Inventive 1 | 0.9478 | 6.1 | — |
| 2 | Inventive 2 | 0.9486 | 6.9 | 378 |
| 3 | Inventive 1 | 0.9487 | 8.0 | — |
| 4 | Inventive 1 | 0.9485 | 7.6 | — |
| 5 | Inventive 1 | 0.9486 | 6.5 | — |
| 6 | Inventive 1 | 0.9488 | 5.6 | — |
| 7 | Inventive 2 | 0.9493 | 5.5 | 462 |
| 8 | Inventive 2 | 0.9482 | 6.4 | 316 |
| 9 | Inventive 2 | 0.9485 | 6.7 | 422 |
| 10 | Inventive 2 | 0.9488 | 6.3 | 524 |
| 11 | Inventive 2 | 0.9486 | 6.5 | 350 |
| 12 | Inventive 2 | 0.9484 | 6.1 | 292 |
| 13 | Inventive 2 | 0.9485 | 6.0 | 448 |
| 14 | Inventive 2 | 0.9481 | 5.1 | 398 |
| 15 | Inventive 2 | 0.9480 | 5.8 | 342 |
| 16 | Comparative 2 | 0.9495 | 6.7 | 150 |
| 17 | Comparative 2 | 0.9501 | 7.2 | 158 |
| 18 | Comparative 2 | 0.9471 | 5.7 | 131 |
| 19 | Comparative 2 | 0.9478 | 6.3 | 220 |
| 20 | Comparative 2 | 0.9503 | 6.1 | 195 |
| 21 | Comparative 2 | 0.9419 | 6.4 | 481 |
| 22 | Comparative 2 | 0.9409 | 5.3 | 371 |
| 23 | Comparative 2 | 0.9545 | 7.6 | 189 |
| 24 | Comparative 2 | 0.9464 | 13.0 | 311 |
| 25 | Comparative 2 | 0.9431 | 3.4 | 409 |
| 26 | Comparative 2 | 0.9495 | 12.1 | — |
| 27 | Comparative 2 | 0.9491 | 22.0 | 217 |
| 28 | Comparative 2 | 0.9448 | 5.4 | 590 |
| 29 | Comparative 2 | 0.9453 | 5.4 | 592 |
| 30 | Comparative 2 | 0.9482 | 11.3 | 499 |
| 31 | Comparative 2 | 0.9479 | 11.8 | 360 |
| 32 | Comparative 2 | 0.9481 | 10.7 | — |
| 33 | Comparative 2 | 0.9493 | 6.4 | 399 |
| 34 | Comparative 2 | 0.9579 | 6.0 | 366 |
| 35 | Comparative 2 | 0.9513 | 41.5 | 189 |
| 36 | Comparative 2 | 0.9529 | 8.0 | — |
| 37 | Comparative 2 | 0.9574 | 23.1 | — |
| 38 | Comparative 2 | 0.9578 | 19.5 | — |
| 39 | Comparative 2 | 0.9535 | 8.4 | — |
| 40 | Comparative 2 | 0.9537 | 7.0 | — |

TABLE V

| | Molecular Weight Characterization (g/mol) | | | | | | |
|---|---|---|---|---|---|---|---|
| Example | Mn/1000 | Mw/1000 | Mz/1000 | Mv/1000 | Mp/1000 | Mw/Mn | Mz/Mw |
| 1 | 8.6 | 287 | 1339 | 206 | 24 | 33.2 | 4.67 |
| 2 | 8.1 | 287 | 1331 | 205 | 24 | 35.4 | 4.63 |
| 3 | 7.5 | 310 | 1399 | 223 | 22 | 41.6 | 4.51 |
| 4 | 8.5 | 298 | 1302 | 215 | 23 | 35.1 | 4.37 |
| 5 | 9.3 | 312 | 1338 | 227 | 24 | 33.4 | 4.29 |
| 6 | 8.1 | 262 | 1271 | 186 | 24 | 32.6 | 4.84 |
| 7 | 9.6 | 279 | 1119 | 204 | 20 | 29.1 | 4.01 |
| 8 | 9.0 | 251 | 1028 | 186 | 22 | 28.0 | 4.09 |
| 9 | 12.0 | 273 | 1053 | 203 | 24 | 22.8 | 3.86 |
| 10 | 12.1 | 278 | 1079 | 207 | 25 | 22.9 | 3.88 |
| 11 | 13.0 | 277 | 1085 | 207 | 516 | 21.3 | 3.92 |
| 12 | 12.3 | 282 | 1112 | 210 | 523 | 23.0 | 3.94 |
| 13 | 11.9 | 269 | 1060 | 2.01 | 490 | 22.7 | 3.94 |
| 14 | 12.7 | 291 | 1140 | 217 | 523 | 23.0 | 3.91 |
| 15 | 13.1 | 287 | 1121 | 214 | 530 | 21.9 | 3.90 |
| 16 | 12.6 | 311 | 1376 | 227 | 34 | 24.6 | 4.42 |
| 17 | 15.9 | 314 | 1455 | 229 | 40 | 19.8 | 4.63 |
| 18 | 22.6 | 397 | 2001 | 285 | 68 | 17.6 | 5.05 |
| 19 | 38.2 | 438 | 2632 | 308 | 81 | 11.5 | 6.01 |
| 20 | 10.2 | 282 | 1275 | 207 | 29 | 27.8 | 4.51 |
| 21 | 8.6 | 182 | 506 | 147 | 239 | 21.1 | 2.78 |
| 22 | 6.5 | 183 | 494 | 148 | 258 | 28.1 | 2.70 |
| 23 | 6.4 | 182 | 549 | 143 | 258 | 28.5 | 3.02 |
| 24 | 5.5 | 182 | 593 | 140 | 328 | 33.2 | 3.26 |
| 25 | 8.5 | 259 | 868 | 200 | 420 | 30.5 | 3.35 |
| 26 | 6.2 | 188 | 767 | 138 | 388 | 30.6 | 4.07 |
| 27 | 5.6 | 172 | 683 | 126 | 349 | 30.6 | 3.97 |
| 28 | 8.8 | 254 | 877 | 207 | 436 | 28.8 | 3.45 |
| 29 | 10.1 | 263 | 869 | 200 | 483 | 26.1 | 3.30 |
| 30 | 8.9 | 256 | 1016 | 187 | 19 | 28.9 | 3.96 |
| 31 | 8.3 | 251 | 1233 | 179 | 19 | 30.2 | 4.92 |
| 32 | 8.1 | 242 | 961 | 177 | 17 | 29.8 | 3.97 |
| 33 | 8.9 | 268 | 1027 | 199 | 479 | 30.2 | 3.83 |
| 34 | 9.5 | 268 | 1085 | 197 | 472 | 28.3 | 4.05 |
| 35 | 7.6 | 221 | 1041 | 155 | 18 | 29.1 | 4.71 |
| 36 | 10.1 | 192 | 752 | 162 | 353 | 19.1 | 3.91 |
| 37 | 10.5 | 178 | 709 | 133 | 17 | 17.0 | 3.97 |
| 38 | 10.7 | 181 | 712 | 136 | 16 | 16.9 | 3.93 |
| 39 | 10.6 | 195 | 678 | 139 | 351 | 18.3 | 3.48 |
| 40 | 10.7 | 200 | 689 | 144 | 333 | 18.6 | 3.45 |

TABLE VI

| | Molecular Weight Characterization (g/mol) - Low molecular weight component | | | | | |
|---|---|---|---|---|---|---|
| Example | Mn/1000 | Mw/1000 | Mz/1000 | Mw/Mn | Mz/Mw | Wt. % |
| 1 | 7.6 | 39.2 | 108 | 5.15 | 2.76 | 66.9 |
| 2 | 7.2 | 37.6 | 107 | 5.21 | 2.85 | 62.6 |
| 3 | 5.8 | 34.5 | 92 | 5.90 | 2.66 | 62.4 |
| 4 | 6.2 | 34.4 | 91 | 3.32 | 2.65 | 62.2 |
| 5 | 6.5 | 36.4 | 101 | 5.58 | 2.77 | 60.8 |
| 6 | 6.2 | 34.8 | 89 | 5.64 | 2.56 | 67.0 |
| 7 | 6.4 | 32.5 | 96 | 5.11 | 2.94 | 62.6 |
| 8 | 6.2 | 32.4 | 80 | 5.20 | 2.46 | 60.5 |
| 9 | 8.2 | 38.9 | 101 | 4.76 | 2.58 | 62.7 |
| 10 | 8.2 | 39.1 | 101 | 4.75 | 2.59 | 62.7 |
| 11 | 8.2 | 35.0 | 83 | 4.28 | 2.37 | 60.3 |
| 12 | 8.2 | 39.4 | 104 | 4.80 | 2.63 | 62.4 |
| 13 | 7.7 | 36.1 | 93 | 4.67 | 2.58 | 61.4 |
| 14 | 8.2 | 38.4 | 99 | 4.67 | 2.59 | 61.3 |
| 15 | 8.4 | 38.0 | 97 | 4.51 | 2.55 | 61.6 |
| 16 | 8.7 | 43.9 | 105 | 5.07 | 2.38 | 65.7 |
| 17 | 11.2 | 50.3 | 109 | 4.49 | 2.17 | 68.7 |
| 18 | 18.4 | 71.4 | 135 | 3.87 | 1.90 | 71.5 |
| 19 | 29.7 | 89.4 | 163 | 3.00 | 1.82 | 73.5 |
| 20 | 6.5 | 32.1 | 71 | 4.96 | 2.20 | 60.8 |
| 21 | 1.9 | 8.3 | 18 | 4.32 | 2.21 | 32.5 |
| 22 | 2.2 | 9.8 | 23 | 8.25 | 2.32 | 34.4 |
| 23 | 2.2 | 9.7 | 24 | 6.42 | 2.43 | 37.3 |
| 24 | 2.6 | 11.1 | 26 | 5.13 | 2.31 | 43.8 |
| 25 | 5.7 | 31.2 | 110 | 4.59 | 3.51 | 53.1 |

TABLE VI-continued

Molecular Weight Characterization (g/mol) - Low molecular weight component

| Example | Mn/1000 | Mw/1000 | Mz/1000 | Mw/Mn | Mz/Mw | Wt. % |
|---|---|---|---|---|---|---|
| 26 | 3.4 | 14.7 | 38 | 5.89 | 2.59 | 53.8 |
| 27 | 3.3 | 16.5 | 45 | 5.89 | 2.75 | 57.0 |
| 28 | 4.8 | 22.1 | 54 | 5.18 | 2.44 | 51.4 |
| 29 | 5.5 | 22.3 | 53 | 4.67 | 2.40 | 52.5 |
| 30 | 6.1 | 28.8 | 79 | 4.38 | 2.75 | 63.7 |
| 31 | 5.8 | 27.9 | 67 | 5.28 | 2.40 | 64.6 |
| 32 | 5.4 | 26.4 | 67 | 4.24 | 2.52 | 62.9 |
| 33 | 5.5 | 26.7 | 79 | 4.76 | 2.69 | 57.3 |
| 34 | 5.6 | 27.4 | 75 | 4.64 | 2.73 | 59.0 |
| 35 | 6.0 | 28.5 | 72 | 4.42 | 2.54 | 69.8 |
| 36 | 7.1 | 28.9 | 77 | 4.09 | 2.67 | 56.3 |
| 37 | 6.8 | 23.9 | 56 | 3.50 | 2.35 | 61.5 |
| 38 | 6.7 | 23.0 | 54 | 3.45 | 2.34 | 59.5 |
| 39 | 6.0 | 21.0 | 49 | 3.48 | 2.35 | 53.6 |
| 40 | 5.5 | 19.5 | 48 | 3.52 | 2.45 | 50.5 |

TABLE VII

Molecular Weight Characterization (g/mol)- High molecular weight component

| Example | Mn/1000 | Mw/1000 | Mz/1000 | Mw/Mn | Mz/Mw |
|---|---|---|---|---|---|
| 1 | 381 | 770 | 1392 | 2.02 | 1.81 |
| 2 | 329 | 666 | 1208 | 2.03 | 1.81 |
| 3 | 359 | 767 | 1452 | 2.14 | 1.89 |
| 4 | 342 | 743 | 1383 | 2.17 | 1.86 |
| 5 | 353 | 761 | 1468 | 2.16 | 1.93 |
| 6 | 335 | 744 | 1407 | 2.22 | 1.89 |
| 7 | 378 | 728 | 1311 | 1.92 | 1.80 |
| 8 | 296 | 596 | 1074 | 2.02 | 1.80 |
| 9 | 385 | 681 | 1138 | 1.77 | 1.67 |
| 10 | 394 | 694 | 1164 | 1.76 | 1.68 |
| 11 | 351 | 662 | 1150 | 1.88 | 1.74 |
| 12 | 395 | 701 | 1199 | 1.78 | 1.71 |
| 13 | 363 | 650 | 1116 | 1.79 | 1.72 |
| 14 | 393 | 704 | 1211 | 1.79 | 1.72 |
| 15 | 392 | 701 | 1202 | 1.79 | 1.71 |
| 16 | 473 | 832 | 1487 | 1.76 | 1.79 |
| 17 | 522 | 924 | 1684 | 1.77 | 1.82 |
| 18 | 619 | 1280 | 2471 | 2.07 | 1.93 |
| 19 | 368 | 1456 | 3213 | 3.95 | 2.21 |
| 20 | 307 | 639 | 1105 | 2.08 | 1.73 |
| 21 | 90 | 266 | 472 | 2.97 | 1.77 |
| 22 | 110 | 301 | 523 | 2.73 | 1.74 |
| 23 | 98 | 301 | 551 | 3.06 | 1.83 |
| 24 | 99 | 315 | 562 | 3.19 | 1.78 |
| 25 | 338 | 576 | 926 | 1.71 | 1.61 |
| 26 | 124 | 384 | 702 | 3.10 | 1.83 |
| 27 | 178 | 408 | 687 | 2.30 | 1.68 |
| 28 | 264 | 525 | 856 | 1.99 | 1.63 |
| 29 | 237 | 530 | 858 | 2.24 | 1.62 |
| 30 | 391 | 668 | 1073 | 1.71 | 1.61 |
| 31 | 358 | 650 | 1145 | 1.81 | 1.76 |
| 32 | 342 | 618 | 1009 | 1.81 | 1.63 |
| 33 | 310 | 594 | 999 | 1.92 | 1.68 |
| 34 | 327 | 615 | 1043 | 1.88 | 1.70 |
| 35 | 398 | 705 | 1145 | 1.77 | 1.63 |
| 36 | 234 | 433 | 690 | 1.85 | 1.59 |
| 37 | 223 | 425 | 705 | 1.91 | 166 |
| 38 | 213 | 411 | 682 | 1.93 | 1.66 |
| 39 | 204 | 396 | 661 | 1.95 | 1.67 |
| 40 | 190 | 375 | 635 | 1.98 | 1.69 |

TABLE VIII

Rheological Characterization at 190° C.

| Example | Zero shear $\eta$ (Pa-sec) | Tau ($\eta$) (sec) | CY-a parameter | $\eta$ @ 0.1 (Pa-sec) | Tan d @ 0.1 (degrees) | $\eta$ @ 100 (Pa-sec) | Tan d @ 100 (degrees) | $\eta$ @ 0.1 / $\eta$ @ 100 |
|---|---|---|---|---|---|---|---|---|
| 1 | 282,400 | 3.53 | 0.531 | 140,200 | 1.97 | 2172 | 0.354 | 64.5 |
| 2 | 220,800 | 2.01 | 0.534 | 128,400 | 2.48 | 2635 | 0.373 | 48.7 |
| 3 | 373,800 | 3.42 | 0.582 | 204,500 | 2.08 | 3016 | 0.340 | 67.8 |
| 4 | 363,700 | 3.40 | 0.580 | 198,800 | 2.08 | 2948 | 0.340 | 67.4 |
| 5 | 402,800 | 3.19 | 0.574 | 222,100 | 2.13 | 3423 | 0.344 | 64.9 |
| 6 | 295,600 | 3.61 | 0.538 | 147,900 | 1.97 | 2246 | 0.351 | 65.9 |
| 7 | 266,500 | 2.58 | 0.620 | 166,000 | 2.45 | 2721 | 0.337 | 61.0 |
| 8 | 197,800 | 1.63 | 0.491 | 111,500 | 2.55 | 2692 | 0.403 | 41.4 |
| 9 | 251,000 | 2.37 | 0.525 | 137,800 | 2.30 | 2628 | 0.370 | 52.4 |
| 10 | 261,100 | 2.44 | 0.539 | 145,900 | 2.31 | 2693 | 0.364 | 54.2 |
| 11 | 261,900 | 2.40 | 0.536 | 146,000 | 2.31 | 2728 | 0.365 | 53.5 |
| 12 | 264,200 | 2.30 | 0.536 | 149,000 | 2.35 | 2849 | 0.367 | 52.3 |
| 13 | 223,700 | 2.15 | 0.537 | 128,600 | 2.43 | 2547 | 0.369 | 50.5 |
| 14 | 273,400 | 2.30 | 0.547 | 157,400 | 2.39 | 2971 | 0.363 | 53.0 |
| 15 | 264,800 | 2.35 | 0.544 | 150,600 | 2.35 | 2818 | 0.363 | 53.4 |
| 16 | 356,900 | 3.84 | 0.565 | 183600 | 1.96 | 2611 | 0.341 | 70.3 |
| 17 | 469,800 | 5.48 | 0.535 | 204100 | 1.67 | 2564 | 0.341 | 79.6 |
| 18 | 4,167,000 | 63.37 | 0.307 | 277100 | 0.93 | 2707 | 0.385 | 102.4 |
| 19 | — | — | 0.048 | 232800 | 0.71 | 2964 | 0.603 | 78.5 |
| 20 | 239,900 | 2.38 | 0.563 | 140500 | 2.39 | 2556 | 0.356 | 55.0 |

TABLE VIII-continued

Rheological Characterization at 190° C.

| Example | Zero shear (Pa-sec) | Tau (η) (sec) | CY-a parameter | η @ 0.1 (Pa-sec) | Tan d @ 0.1 (degrees) | η @ 100 (Pa-sec) | Tan d @ 100 (degrees) | η @ 0.1 / η @ 100 |
|---|---|---|---|---|---|---|---|---|
| 21 | 33,940 | 0.16 | 0.600 | 30,410 | 10.01 | 2757 | 0.533 | 11.0 |
| 22 | 49,650 | 0.20 | 0.575 | 42,970 | 8.02 | 3343 | 0.519 | 12.9 |
| 23 | 42,850 | 0.19 | 0.539 | 36,160 | 7.31 | 2897 | 0.551 | 12.5 |
| 24 | 47,760 | 0.32 | 0.525 | 37,720 | 5.48 | 2235 | 0.503 | 16.9 |
| 25 | 230,900 | 1.67 | 0.602 | 154,900 | 2.95 | 3292 | 0.356 | 47.1 |
| 26 | 43,610 | 0.40 | 0.543 | 34,230 | 5.18 | 1756 | 0.468 | 19.5 |
| 27 | 51,990 | 0.50 | 0.553 | 40,180 | 4.80 | 1806 | 0.444 | 22.2 |
| 28 | 208,600 | 1.50 | 0.601 | 143,000 | 3.11 | 3247 | 0.361 | 44.0 |
| 29 | 210,100 | 1.68 | 0.596 | 139,900 | 2.92 | 2986 | 0.358 | 46.9 |
| 30 | 200,100 | 2.43 | 0.600 | 123,100 | 2.47 | 2128 | 0.344 | 57.8 |
| 31 | 214,200 | 2.61 | 0.613 | 131,700 | 2.42 | 2161 | 0.339 | 60.9 |
| 32 | 176,800 | 2.16 | 0.581 | 108,900 | 2.55 | 2049 | 0.354 | 53.1 |
| 33 | 199,000 | 1.64 | 0.532 | 121,000 | 2.70 | 2784 | 0.383 | 43.5 |
| 34 | 197,000 | 1.85 | 0.570 | 123,700 | 2.69 | 2561 | 0.363 | 48.3 |
| 35 | 158,700 | 2.88 | 0.573 | 89,770 | 2.22 | 1460 | 0.347 | 61.5 |
| 36 | 69,890 | 0.50 | 0.519 | 50,570 | 4.28 | 2540 | 0.503 | 19.9 |
| 37 | 55,410 | 0.51 | 0.471 | 37,830 | 3.86 | 1728 | 0.496 | 21.9 |
| 38 | 57,770 | 0.49 | 0.469 | 39,600 | 3.91 | 1853 | 0.501 | 21.4 |
| 39 | 71,170 | 0.47 | 0.492 | 39,600 | 3.91 | 1853 | 0.501 | 21.4 |
| 40 | 70,570 | 0.43 | 0.483 | 50,570 | 4.28 | 2540 | 0.503 | 19.9 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. A catalyst composition comprising a metallocene compound; a solid activator; and optionally, a co-catalyst; wherein the solid activator (or the supported metallocene catalyst) has a d50 average particle size in a range from 15 to 50 μm; and a particle size span ((d90-d10)/d50) in a range from 0.5 to 1.5.

Aspect 2. The composition defined in aspect 1, wherein the d50 average particle size is in any range disclosed herein, e.g., from 15 to 40 μm, from 15 to 25 μm, from 20 to 30 μm, from 17 to 40 μm, from 17 to 27 μm, or from 17 to 25 μm.

Aspect 3. The composition defined in aspect 1 or 2, wherein the span ((d90-d10)/d50) is an any range disclosed herein, e.g., from 0.5 to 1.2, from 0.6 to 1.4, from 0.6 to 1.3, from 0.6 to 1.1, from 0.7 to 1.4, or from 0.7 to 1.2.

Aspect 4. The composition defined in any one of the preceding aspects, wherein the solid activator (or the supported metallocene catalyst) has a d10 particle size in any range disclosed herein, e.g., greater than or equal to 10 μm, greater than or equal to 11 μm, greater than or equal to 12 μm, in a range from 10 to 20 μm, or in a range from 10 to 18 μm.

Aspect 5. The composition defined in any one of the preceding aspects, wherein the solid activator (or the supported metallocene catalyst) has a d95 particle size in any range disclosed herein, e.g., less than or equal to 65 μm, less than or equal to 60 μm, in a range from 25 to 65 μm, or in a range from 28 to 60 μm.

Aspect 6. The composition defined in any one of the preceding aspects, wherein the solid activator (or the supported metallocene catalyst) has a ratio of d90/d10 in any range disclosed herein, e.g., from 1.5 to 5, from 1.5 to 4, from 1.5 to 3, from 1.8 to 5, from 1.8 to 4, or from 1.8 to 3.

Aspect 7. The composition defined in any one of the preceding aspects, wherein the amount of the solid activator (or the supported metallocene catalyst) having a particle size of less than 10 μm is in any range disclosed herein, e.g., less than or equal to 15 wt. %, less than or equal to 10 wt. %, less than or equal to 8 wt. %, less than or equal to 5 wt. %, or less than or equal to 2 wt. %.

Aspect 8. The composition defined in any one of the preceding aspects, wherein the amount of the solid activator (or the supported metallocene catalyst) having a particle size of greater than 45 μm is in any range disclosed herein, e.g., less than or equal to 20 wt. %, less than or equal to 15 wt. %, less than or equal to 10 wt. %, less than or equal to 5 wt. %, or less than or equal to 2 wt. %.

Aspect 9. The composition defined in any one of the preceding aspects, wherein the amount of the solid activator (or the supported metallocene catalyst) having a particle size of less than 50 μm is in any range disclosed herein, e.g., at least 85 wt. %, at least 88 wt. %, at least 90 wt. %, or at least 95 wt. %.

Aspect 10. The composition defined in any one of aspects 1-9, wherein the solid activator comprises fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, fluorided-chlorided silica-coated alumina, sulfated silica-coated alumina, phosphated silica-coated alumina, or any combination thereof.

Aspect 11. The composition defined in any one of aspects 1-9, wherein the activator comprises fluorided alumina, sulfated alumina, fluorided silica-alumina, sulfated silica-alumina, fluorided silica-coated alumina, fluorided-chlorided silica-coated alumina, sulfated silica-coated alumina, or any combination thereof.

Aspect 12. The composition defined in any one of aspects 1-9, wherein the solid activator comprises a fluorided solid oxide and/or a sulfated solid oxide.

Aspect 13. The composition defined in any one of aspects 1-12, wherein the catalyst composition comprises a co-catalyst, e.g., any suitable co-catalyst.

Aspect 14. The composition defined in any one of aspects 1-13, wherein the co-catalyst comprises any organoaluminum compound disclosed herein.

Aspect 15. The composition defined in aspect 14, wherein the organoaluminum compound comprises trimethylaluminum, triethylaluminum, triisobutylaluminum, or a combination thereof.

Aspect 16. The composition defined in any one of the preceding aspects, wherein the catalyst composition is substantially free of aluminoxane compounds, organoboron or organoborate compounds, ionizing ionic compounds, or combinations thereof.

Aspect 17. The composition defined in any one of the preceding aspects, wherein the catalyst composition comprises a single metallocene compound, e.g., a bridged metallocene compound or an unbridged metallocene compound.

Aspect 18. The composition defined in any one of aspects 1-16, wherein the composition comprises metallocene component I comprising any unbridged metallocene compound disclosed herein and metallocene component II comprising any bridged metallocene compound disclosed herein.

Aspect 19. The composition defined in aspect 18, wherein metallocene component II comprises a bridged zirconium or hafnium based metallocene compound.

Aspect 20. The composition defined in aspect 18, wherein metallocene component II comprises a bridged zirconium or hafnium based metallocene compound with an alkenyl substituent.

Aspect 21. The composition defined in aspect 18, wherein metallocene component II comprises a bridged zirconium or hafnium based metallocene compound with an alkenyl substituent and a fluorenyl group.

Aspect 22. The composition defined in aspect 18, wherein metallocene component II comprises a bridged zirconium or hafnium based metallocene compound with a cyclopentadienyl group and a fluorenyl group, and with an alkenyl substituent on the bridging group and/or on the cyclopentadienyl group.

Aspect 23. The composition defined in any one of aspects 18-22, wherein metallocene component II comprises a bridged metallocene compound having an aryl group substituent on the bridging group.

Aspect 24. The composition defined in any one of aspects 18-23, wherein metallocene component I comprises an unbridged zirconium or hafnium based metallocene compound containing two cyclopentadienyl groups, two indenyl groups, or a cyclopentadienyl and an indenyl group.

Aspect 25. The composition defined in any one of aspects 18-23, wherein metallocene component I comprises an unbridged zirconium or hafnium based metallocene compound containing two cyclopentadienyl groups.

Aspect 26. The composition defined in any one of aspects 18-23, wherein metallocene component I comprises an unbridged Zirconium or hafnium based metallocene compound containing two indenyl groups.

Aspect 27. The composition defined in any one of aspects 18-23, wherein metallocene component I comprises an unbridged zirconium or hafnium based metallocene compound containing a cyclopentadienyl and an indenyl group.

Aspect 28. The composition defined in any one of aspects 18-23, wherein metallocene component I comprises an unbridged zirconium based metallocene compound containing an alkyl-substituted cyclopentadienyl group and an alkenyl-substituted indenyl group.

Aspect 29. The composition defined in any one of aspects 18-28, wherein a weight ratio of metallocene component I to metallocene component II in the catalyst composition is in any range disclosed herein, e.g., from 10:1 to 1:10, from 5:1 to 1:5, or from 2:1 to 1:2.

Aspect 30. The composition defined in any one of aspects 18-29, wherein the catalyst composition is produced by a process comprising contacting, in any order, metallocene component I, metallocene component II, the solid activator, and the co-catalyst.

Aspect 31. The composition defined in any one of the preceding aspects, wherein a catalyst activity of the catalyst composition is in any range disclosed herein, e.g., from 150 to 10,000, from 500 to 7,500, or from 1,000 to 5,000 grams, of ethylene polymer per gram of solid activator per hour, under slurry polymerization conditions, with a triisobutylaluminum co-catalyst, using isobutane as a diluent, and with a polymerization temperature of 90° C. and a reactor pressure of 390 psig.

Aspect 32. A (slurry) polymerization process comprising: contacting the catalyst composition defined in any one of aspects 1-31 with an olefin monomer and an optional olefin comonomer in a polymerization reactor system comprising a loop slurry reactor under polymerization conditions to produce an olefin polymer.

Aspect 33. The process defined in aspect 32, wherein the olefin monomer comprises any olefin monomer disclosed herein, e.g., any $C_2$-$C_{20}$ olefin.

Aspect 34. The process defined in aspect 32, wherein the olefin monomer and the optional olefin comonomer independently comprise a $C_2$-$C_{20}$ alpha-olefin.

Aspect 35. The process defined in any one of aspects 32-34, wherein the olefin monomer comprises ethylene.

Aspect 36. The process defined in any one of aspects 32-35, wherein the catalyst composition is contacted with ethylene and an olefin comonomer comprising a $C_3$-$C_{10}$ alpha-olefin.

Aspect 37. The process defined in any one of aspects 32-36, wherein the catalyst composition is contacted with ethylene and an olefin comonomer comprising 1-butene, 1-hexene, 1-octene, or a mixture thereof.

Aspect 38. The process defined in any one of aspects 32-37, wherein the polymerization reactor system comprises only one loop slurry reactor.

Aspect 39. The process defined in any one of aspects 32-37, wherein the polymerization reactor system comprises two or more reactors, at least one of which is the loop slurry reactor.

Aspect 40. The process defined in any one of aspects 32-39, wherein the olefin polymer comprises any olefin polymer disclosed herein.

Aspect 41. The process defined in any one of aspects 32-40, wherein the olefin polymer comprises an ethylene homopolymer, an ethylene/1-butene copolymer, an ethylene/1-hexene copolymer, and/or an ethylene/1-octene copolymer.

Aspect 42. The process defined in any one of aspects 32-41, wherein the olefin polymer comprises an ethylene/1-hexene copolymer.

Aspect 43. The process defined in any one of aspects 32-42, wherein the polymerization conditions comprise a polymerization reaction temperature in a range from 60° C. to 120° C. and a reaction pressure in a range from 200 to 1000 psig (1.4 to 6.9 MPa).

Aspect 44. The process defined in any one of aspects 32-43, wherein the polymerization conditions are substantially constant, e.g., for a particular polymer grade.

Aspect 45. The process defined in any one of aspects 3244, wherein no hydrogen is added to the polymerization reactor system.

Aspect 46. The process defined in any one of aspects 32-44, wherein hydrogen is added to the polymerization reactor system.

Aspect 47. The process defined in any one of aspects 32-46, wherein the olefin polymer has a density in any range disclosed herein, e.g., from 0.90 to 0.97, from 0.92 to 0.96, from 0.93 to 0.955, or from 0.94 to 0.955 g/cm$^3$.

Aspect 48. The process defined in any one of aspects 3247, wherein the olefin polymer has a Mw in any range disclosed herein, e.g., from 100 to 50) kg/mol, from 150 to 350 kg/mol, or from 200 to 320 kg/mol.

Aspect 49. The process defined in any one of aspects 32-48, wherein the olefin polymer has a ratio of Mw/Mn in any range disclosed herein, e.g., from 5 to 40, from 7 to 25, or from 8 to 15.

Aspect 50. The process defined in any one of aspects 32-49, wherein the olefin polymer has a HLMI in any range disclosed herein, e.g., from 1 to 80, from 2 to 40, from 2 to 30, or from 1 to 20 g/10 min.

Aspect 51. The process defined in any one of aspects 32-50, wherein the olefin polymer contains, independently, less than 0.1 ppm (by weight), less than 0.08 ppm, less than 0.05 ppm, or less than 0.03 ppm, of Mg, V. Ti, or Cr.

Aspect 52. The process defined in any one of aspects 32-51, wherein the olefin polymer is characterized by a film gel count in any range disclosed herein, e.g., less than 100, less than 50, less than 25, less than 10, or less than 5 gels per ft$^2$ of 25 micron film (gels encompass any film defect with a size greater than 200 microns).

Aspect 53. An olefin polymer produced by the process defined in any one of aspects 32-52.

Aspect 54. An ethylene polymer (e.g., in the form of pellets) having (or characterized by): a high load melt index (HLMI) in a range from 4 to 10 g/10 min a density in a range from 0.944 to 0.955 g/cm$^3$; and a higher molecular weight component and a lower molecular weight component, wherein: the higher molecular weight component has a Mn in a range from 280,000 to 440,000 g/mol; and the lower molecular weight component has a Mw in a range from 30,000 to 45,000 g/mol, and a ratio of Mz/Mw in a range from 2.3 to 3.4.

Aspect 55. The polymer defined in aspect 54, wherein the ethylene polymer has a HLMI in any range disclosed herein, e.g., from 4 to 9, from 4 to 8, from 5 to 10, from 5 to 9, or from 5 to 8 g/10 min.

Aspect 56. The polymer defined in aspect 54 or 55, wherein the ethylene polymer has a density in any range disclosed herein, e.g., from 0.944 to 0.952, from 0.945 to 0.955, from 0.945 to 0.953, from 0.945 to 0.95, from 0.946 to 0.955, or from 0.946 to 0.952 g/cm$^3$.

Aspect 57. The polymer defined in any one of aspects 54-56, wherein the lower molecular weight component has a Mw in any range disclosed herein, e.g., from 30,000 to 43,000, from 30,000 to 41,000, from 31,000 to 45,000, from 31,000 to 42,000, from 31,000 to 40,000, from 32,000 to 44.000, or from 32,000 to 42,000 g/mol.

Aspect 58. The polymer defined in any one of aspects 54-57, wherein the higher molecular weight component has a Mn in any range disclosed herein, e.g., from 280,000 to 425,000, from 280,000 to 400,000, from 290,000 to 410, 000, from 300,000 to 440,000, or from 300,000 to 400,000 g/mol.

Aspect 59. The polymer defined in any one of aspects 54-58, wherein the lower molecular weight component has a ratio of Mz/Mw in any range disclosed herein, e.g., from 2.3 to 3.2, from 2.35 to 3.0, from 2.4 to 3.3, from 2.4 to 3.2, or from 2.4 to 3.1.

Aspect 60. The polymer defined in any one of aspects 54-59, wherein an amount of the lower molecular weight component, based on the total polymer, is in any range of weight percentages disclosed herein, e.g., from 56 to 72 wt. %, from 56 to 70 wt. %, from 58 to 72 wt. %, from 58 to 70 wt. %, or from 60 to 68 wt. %

Aspect 61. The polymer defined in any one of aspects 54-60, wherein the lower molecular weight component has a Mn in any range disclosed herein, e.g., from 4,000 to 10,000, from 4,000 to 9,000, from 5.000 to 10,000, from 5.000 to 9,000, or from 5,500 to 8,500 g/mol.

Aspect 62. The polymer defined in any one of aspects 54-61, wherein the lower molecular weight component has a Mz in any range disclosed herein, e.g., from 70,000 to 130,000, from 70,000 to 115,000, from 75,000 to 130,000, from 75,000 to 120,000, or from 75,000 to 115,000 g/mol.

Aspect 63. The polymer defined in any one of aspects 54-62, wherein the higher molecular weight component has a ratio of Mw/Mn in any range disclosed herein, e.g., from 1.6 to 2.4, from 1.7 to 2.4, from 1.7 to 2.3, from 1.8 to 2.4, from 1.8 to 2.3, from 1.9 to 2.4, or from 1.9 to 2.3.

Aspect 64. The polymer defined in any one of aspects 54-63, wherein the higher molecular weight component has a Mz in any range disclosed herein, e.g., from 900,000 to 1,600,000, from 1,000,000 to 1,500,000, from 1,000,000 to 1,400,000, from 1,100,000 to 1,600,000, or from 1,100,000 to 1,500,000 g/mol.

Aspect 65. The polymer defined in any one of aspects 54-64, wherein the ethylene polymer has a Mw in any range disclosed herein, e.g., from 230,000 to 330,000, from 230,000 to 320,000, from 240,000 to 330,000, or from 240,000 to 320,000 g/mol.

Aspect 66. The polymer defined in any one of aspects 54-65, wherein the ethylene polymer has a ratio of Mw/Mn in any range disclosed herein, e.g., from 20 to 45, from 20 to 42, from 22 to 44, from 25 to 45, or from 25 to 42.

Aspect 67. The polymer defined in any one of aspects 54-66, wherein the ethylene polymer has a CY-a parameter in any range disclosed herein, e.g., from 0.45 to 0.65, from 0.47 to 0.63, from 0.47 to 0.61, from 0.5 to 0.65, from 0.5 to 0.63, or from 0.5 to 0.6.

Aspect 68. The polymer defined in any one of aspects 54-67, wherein the ethylene polymer has a relaxation time (Tau(eta) or $\tau(\eta)$) in any range disclosed herein, e.g., from 1.5 to 4, from 1.5 to 3.7, from 2 to 4, or from 2 to 3.6 sec.

Aspect 69. The polymer defined in any one of aspects 54-68, wherein the ethylene polymer has a viscosity at 100 sec$^{-1}$ (eta @100 or $\eta$@100) in any range disclosed herein, e.g., from 2000 to 3600, from 2000 to 3500, from 2100 to 3600, or from 2100 to 3500 Pa-sec.

Aspect 70. The polymer defined in any one of aspects 54-69, wherein the ethylene polymer has a ratio of viscosity at 0.1 sec$^{-1}$ to viscosity at 100 sec$^{-1}$ ($\eta$@0.1/$\eta$@100) in any range disclosed herein, e.g., from 38 to 72, from 40 to 68, from 46 to 68, or from 52 to 72.

Aspect 71. The polymer defined in any one of aspects 54-70, wherein the ethylene polymer contains, independently, less than 0.1 ppm (by weight), less than 0.08 ppm, less than 0.05 ppm, or less than 0.03 ppm, of Mg, V, Ti, or Cr.

Aspect 72. The polymer defined in any one of aspects 54-71, wherein the ethylene polymer is characterized by a film gel count in any range disclosed herein, e.g., less than 100, less than 50, less than 25, less than 10, or less than 5 gels per ft$^2$ of 25 micron film (gels encompass any film defect with a size greater than 200 microns).

Aspect 73. The polymer defined in any one of aspects 54-72, wherein the ethylene polymer is a single reactor product, e.g., not a post-reactor blend of two polymers, for instance, having different molecular weight characteristics.

Aspect 74. The polymer defined in any one of aspects 54-73, wherein the ethylene polymer comprises an ethylene/α-olefin copolymer.

Aspect 75. The polymer defined in any one of aspects 54-74, wherein the ethylene polymer comprises an ethylene homopolymer, an ethylene/1-butene copolymer, an ethylene/1-hexene copolymer, and/or an ethylene/1-octene copolymer.

Aspect 76. The polymer defined in any one of aspects 54-75, wherein the ethylene polymer comprises an ethylene/1-hexene copolymer.

Aspect 77. An article comprising the ethylene polymer defined in any one of aspects 54-76.

Aspect 78. An article comprising the ethylene polymer defined in any one of aspects 54-76, wherein the article is an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product, outdoor play equipment, a pipe, a sheet or tape, a toy, or a traffic barrier.

Aspect 79. A film comprising (or produced from) the polymer defined in any one of aspects 54-76.

Aspect 80. The film defined in aspect 79, wherein the film has a dart impact strength in any range disclosed herein, e.g., greater than or equal to 150 g/mil, greater than or equal to 250 g/mil, from 150 to 750 g/mil, or from 250 to 600 g/mil.

Aspect 81. The film defined in aspect 79 or 80, wherein the film has a gel count in any range disclosed herein, e.g., less than 100, less than 50, less than 25, less than 10, or less than 5 gels per $ft^2$ of film (gels encompass any film defect with a size greater than 200 microns).

Aspect 82. The film defined in any one of aspects 79-81, wherein the film has an average thickness in any range disclosed herein, e.g., from 0.4 to 20 mils, from 0.5 to 8 mils, from 0.8 to 5 mils, from 0.7 to 2 mils, or from 0.7 to 1.5 mils.

Aspect 83. The film defined in any one of aspects 79-82, wherein the film is a blown film.

Aspect 84. The process defined in any one of aspects 32-52, wherein the olefin polymer produced is defined in any one of aspects 54-76.

Aspect 85. An ethylene polymer defined in any one of aspects 54-76 produced by the process defined in any one of aspects 32-52.

Aspect 86. An ethylene polymer (fluff or powder) composition having (or characterized by): a d50 average particle size in a range from 150 to 600 μm; a particle size span ((d90-d10)/d50) in a range from 0.5 to 1.6; less than or equal to 20 wt. % of the composition with a particle size of less than 100 μm; and less than or equal to 5 wt. % of the composition with a particle size of greater than 1000 μm.

Aspect 87. The composition defined in aspect 86, wherein the d50 average particle size is in any range disclosed herein, e.g., from 150 to 450 μm, from 150 to 325 μm, from 150 to 300 μm, from 175 to 325 μm, from 175 to 275 μm, from 200 to 400 μm, or from 200 to 275 μm.

Aspect 88. The composition defined in aspect 86 or 87, wherein the span ((d90-d10)/d50) is an any range disclosed herein, e.g., from 0.75 to 1.5, from 1 to 1.6, from 1.1 to 1.6, or from 1.1 to 1.5.

Aspect 89. The composition defined in any one of aspects 86-88, wherein the amount of the composition having a particle size of greater than 1000 μm is in any range disclosed herein, e.g., less than or equal to 3 wt. %, less than or equal to 2 wt. %, or less than or equal to 1 wt. %.

Aspect 90. The composition defined in any one of aspects 86-89, wherein the amount of the composition having a particle size of less than 100 μm is in any range disclosed herein, e.g., less than or equal to 10 wt. %, less than or equal to 5 wt. %, from 1 to 10 wt. %, or from 1 to 5 wt. %.

Aspect 91. The composition defined in any one of aspects 86-90, wherein the composition has a d90 particle size in any range disclosed herein, e.g., from 300 to 800 μm, from 300 to 600 μm, from 350 to 550 μm, from 375 to 525 μm, from 400 to 750 μm, or from 400 to 500 μm.

Aspect 92. The composition defined in any one of aspects 86-91, wherein the composition has a ratio of d90/d10 in any range disclosed herein, e.g., from 2 to 5, from 2 to 4, from 2.2 to 3.8, from 2.4 to 5, from 2.4 to 3.6, or from 2.7 to 3.3.

Aspect 93. The composition defined in any one of aspects 86-92, wherein the composition has a HLMI in any range disclosed herein, e.g., from 4 to 10, from 4 to 9, from 4 to 8, from 5 to 10, from 5 to 9, or from 5 to 8 g/10 min.

Aspect 94. The composition defined in any one of aspects 86-93, wherein the composition has a density in any range disclosed herein, e.g., from 0.944 to 0.955, from 0.944 to 0.952, from 0.945 to 0.955, from 0.945 to 0.953, from 0.945 to 0.95, from 0.946 to 0.955, or from 0.946 to 0.952 g/cm$^3$.

We claim:

1. A solid activator comprising:
    a fluorided solid oxide and/or a sulfated solid oxide;
    wherein the solid activator has:
        a d50 average particle size in a range from 15 to 50 μm; and
        a particle size span in a range from 0.5 to 1.5.

2. The solid activator of claim 1, wherein:
    the d50 average particle size is in a range from 15 to 30 μm; and
    the particle size span is in a range from 0.6 to 1.3.

3. The solid activator of claim 2, wherein an amount of the solid activator having:
    a particle size of less than 10 μm is less than or equal to 8 wt %; and
    a particle size of greater than 45 μm is less than or equal to 10 wt %.

4. The solid activator of claim 1, wherein an amount of the solid activator having a particle size of greater than 45 μm is less than or equal to 5 wt %.

5. The solid activator of claim 1, wherein the d50 average particle size is from 15 to 25 μm.

6. The solid activator of claim 1, wherein the d50 average particle size is from 17 to 25 μm.

7. The solid activator of claim 1, wherein the particle size span is from 0.7 to 1.2.

8. The solid activator of claim 1, wherein the particle size span is from 0.6 to 1.1.

9. The solid activator of claim 8, wherein the d50 average particle size is from 17 to 27 μm.

10. The solid activator of claim 8, wherein the d50 average particle size is from 20 to 30 μm.

11. The solid activator of claim 1, wherein an amount of the solid activator having a particle size of less than 10 μm is less than or equal to 5 wt %.

12. The solid activator of claim 11, wherein the d50 average particle size is from 15 to 25 μm.

13. The solid activator of claim 11, wherein the particle size span is from 0.7 to 1.2.

14. The solid activator of claim 11, wherein the d50 average particle size is from 20 to 30 μm.

15. A solid activator comprising:
fluorided alumina, sulfated alumina, fluorided silica-alumina, sulfated silica-alumina, fluorided silica-coated alumina, fluorided-chlorided silica-coated alumina, sulfated silica-coated alumina, or any combination thereof;
wherein the solid activator has:
   a d50 average particle size in a range from 15 to 50 μm; and
   a particle size span in a range from 0.5 to 1.5.

16. The solid activator of claim 15, wherein:
the d50 average particle size is in a range from 17 to 27 μm; and
the particle size span is in a range from 0.6 to 1.3.

17. The solid activator of claim 16, wherein an amount of the solid activator having:
   a particle size of less than 10 μm is less than or equal to 5 wt %; and
   a particle size of greater than 45 μm is less than or equal to 5 wt %.

18. The solid activator of claim 15, wherein:
the d50 average particle size is from 17 to 25 μm; and
the particle size span is from 0.6 to 1.1.

19. The solid activator of claim 15, wherein:
the d50 average particle size is from 17 to 25 μm; and
the particle size span is from 0.7 to 1.2.

20. The solid activator of claim 15, wherein an amount of the solid activator having:
   a particle size of less than 10 μm is less than or equal to 2 wt %; and
   a particle size of greater than 45 μm is less than or equal to 2 wt %.

21. The solid activator of claim 15, wherein the solid activator has a ratio of d90/d10 from 1.8 to 3.

* * * * *